(12) United States Patent
Miyagi

(10) Patent No.: US 10,075,910 B2
(45) Date of Patent: Sep. 11, 2018

(54) BASE STATION DEVICE, RADIO ACCESS SYSTEM, AND METHOD OF CONTROLLING BASE STATION DEVICE

(71) Applicant: FUJITSU LIMITED, Kawasaki-shi, Kanagawa (JP)

(72) Inventor: Ryota Miyagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 14/876,537

(22) Filed: Oct. 6, 2015

(65) Prior Publication Data

US 2016/0119866 A1   Apr. 28, 2016

(30) Foreign Application Priority Data

Oct. 28, 2014 (JP) ................... 2014-218962

(51) Int. Cl.
| | |
|---|---|
| H04W 24/02 | (2009.01) |
| H04W 52/02 | (2009.01) |
| H04W 76/28 | (2018.01) |
| H04W 88/08 | (2009.01) |

(52) U.S. Cl.
CPC ....... *H04W 52/0206* (2013.01); *H04W 24/02* (2013.01); *H04W 76/28* (2018.02); *H04W 88/08* (2013.01); *Y02D 70/00* (2018.01); *Y02D 70/24* (2018.01)

(58) Field of Classification Search
None
See application file for complete search history.

(56) References Cited

U.S. PATENT DOCUMENTS

| | | | | |
|---|---|---|---|---|
| 2008/0242371 | A1 | 10/2008 | Chiba et al. | |
| 2009/0312031 | A1* | 12/2009 | Harris | H04L 41/147 455/453 |
| 2010/0323683 | A1* | 12/2010 | Kazmi | H04W 64/00 455/422.1 |
| 2012/0270593 | A1* | 10/2012 | Park | H04W 52/343 455/522 |

FOREIGN PATENT DOCUMENTS

| | | |
|---|---|---|
| JP | 05-183478 A | 7/1993 |
| JP | 09-331288 A | 12/1997 |
| JP | 2010-288278 A | 12/2010 |
| WO | WO 2007/066393 A1 | 6/2007 |

* cited by examiner

*Primary Examiner* — Ayanah George
(74) *Attorney, Agent, or Firm* — Arent Fox LLP

(57) ABSTRACT

A base station device includes a processor. The processor is configured to acquire first information on a first communication load of the base station device. The processor is configured to determine, on basis of the first information, whether a first event occurs. The processor is configured to acquire, upon determining that the first event occurs, second information on second communication loads of other base station devices located within a predetermined range from the base station device. The processor is configured to determine an impact range and an impact time of the first event on basis of the first information and the second information. The processor is configured to instruct terminal devices within the impact range to change, during the impact time, a setting of discontinuous reception from a normal setting to a first setting for easier detection of an incoming call.

7 Claims, 18 Drawing Sheets

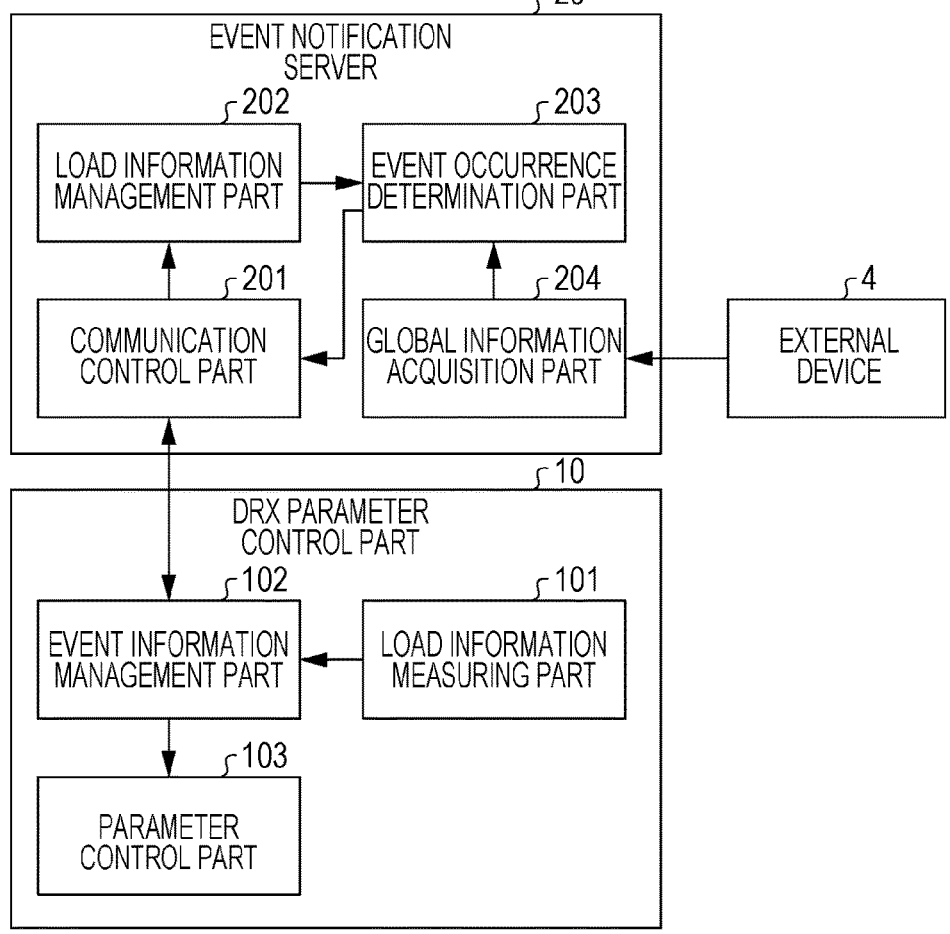
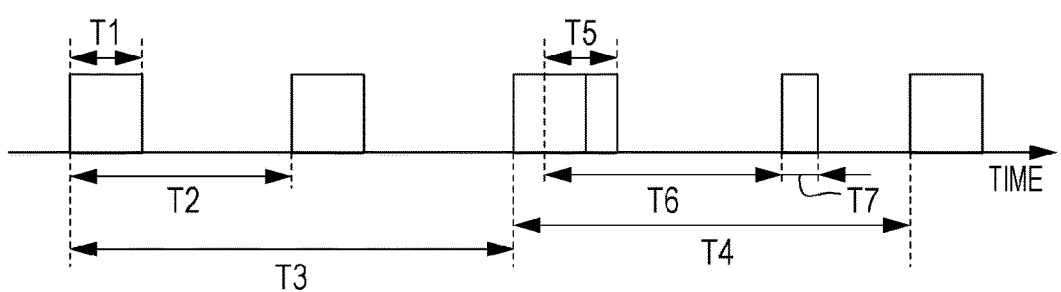

| | CHANGE RATE OF NUMBER OF CONNECTED UEs | CHANGE RATE OF COMMUNICATION TRAFFIC | CHANGE RATE OF NUMBER OF CONNECTED UEs OF NEARBY eNBs | CHANGE RATE OF COMMUNICATION TRAFFIC OF NEARBY eNBs | ... |
|---|---|---|---|---|---|
| EVENT A | 20% | 20% | 5% | 5% | ... |
| EVENT B | 5% | 15% | 2% | 4% | ... |
| EVENT C | 10% | 5% | 4% | 2% | ... |

| EVENT TYPE | LONG-DRX CYCLE | ON-DURATION TIMER | DRX-INACTIVITY TIMER | ... |
|---|---|---|---|---|
| TRAIN ACCIDENT | P1 | P2 | P3 | ... |
| DISASTER | Q1 | Q2 | Q3 | ... |
| FESTIVAL | R1 | R2 | R3 | ... |

BASE STATION DEVICE, RADIO ACCESS SYSTEM, AND METHOD OF CONTROLLING BASE STATION DEVICE

CROSS-REFERENCE TO RELATED APPLICATION

This application is based upon and claims the benefit of priority of the prior Japanese Patent Application No. 2014-218962, filed on Oct. 28, 2014, the entire contents of which are incorporated herein by reference.

FIELD

The embodiments discussed herein are related to a base station device, a radio access system, and a method of controlling the base station device.

BACKGROUND

In recent years, discontinuous reception (DRX) has been increasingly used as a function for saving power consumption for data transmission and reception between a base station device (eNB: evolved node B) and a mobile station device (UE: user equipment). The DRX is implemented in such a way that the power supply is turned on at a specific timing and is turned off when there is no data transmission and reception for a fixed time period.

An effect of power consumption saving may be improved by lengthening the off-time of the power supply in the DRX. However, when the power supply is turned off, data reception is disabled and thereby a communication delay may occur. Therefore, it is preferable to optimize DRX parameters determining the DRX setting such as an off-time of power supply in order to attain a proper balance between the power consumption saving and the communication environment.

DRX parameters affecting the off-time of the power supply in the DRX include, for example, a DRX cycle, an on-duration time, and an inactivity timer. The DRX cycle is a parameter indicating a length of an ON and OFF cycle of power supply. The on-duration time is a parameter indicating duration of monitoring data transmission and reception after the power supply is turned on. The inactivity timer is a parameter indicating an extension time of the monitoring duration, when data is transmitted or received.

A related technique of dynamically changing the DRX parameters responds to a change of the load by measuring only present load information in a single eNB, and changing the DRX parameters at a timing when the load difference exceeds a threshold value.

In recent years, there have been increasing small-size cells of base station devices along with an increase in use of smart phones and a resultant increase in data communication traffic. With the small-size cells, since each eNB covers a small area, a specific characteristic of users may be found out. That is, use tendency at each eNB has a close relationship with a time zone and an event which occurs in the covered area.

For example, as for an eNB located near a transport facility, the possibility of communication is considered to increase when a transportation disorder occurs, because people involved may try to know the cause of the transportation disorder and find out an alternative transportation route. This may results in an increase in communication to the eNB. Further, in recent years, push-type services for smart phones have been increasing. The push-type services include, for example, services for providing life information such as disaster alarm mail, road information, and weather information. Many of such push-type services start communication upon occurrence of an actual event such as a disaster. In other words, in the case where a push-type service is provided, a large volume of communication may occur in response to the occurred event. In this case, communication to the eNB may also be increased.

As a technique of implementing the discontinuous reception, there is a related technique that determines the discontinuous reception cycle on the basis of an incoming call history. There is another related technique that changes the discontinuous reception cycle on the basis of an incoming call frequency. There is yet another related technique that changes the discontinuous reception cycle upon occurrence of an outgoing call to an emergency telephone number.

Related techniques are disclosed in, for example, Japanese Laid-open Patent Publication No. 2010-288278, Japanese Laid-open Patent Publication No. 09-331288, Japanese Laid-open Patent Publication No. 05-183478, and International Publication Pamphlet No. WO2007/066393.

According to the related technique that changes the DRX parameters when a present load in a single eNB exceeds a threshold value, the DRX parameters are not changed until the load actually becomes high. For this reason, the DRX parameters are changed only after elapse of a certain period of time following the occurrence of an event which increases communication. This means that it is difficult to set appropriate intervals of the discontinuous reception in a case where communication traffic concentrates immediately after the occurrence of an event. If increase of communication is kept for a certain period of time after the occurrence of an event, an appropriate setting for the certain period of time may be assured by one-time measurement of the load. Instead, in the case where there is an irregular or regular increase in the communication traffic, it is preferable to increase the frequency of measuring the load in order to change the parameters at an appropriate timing. To this end, in the related technique, the eNB has to calculate a change difference frequently, and may have increased load.

Even with the related technique that changes the intervals of the discontinuous reception on the basis of the incoming call history or incoming call frequency, it is difficult to set appropriate discontinuous reception while keeping the load on a base station device low, since the technique does not consider an increase in the communication traffic due to the occurrence of a specific event. With the related technique that changes the intervals of the discontinuous reception at the timing of an outgoing call to an emergency telephone number, it is also difficult to set appropriate discontinuous reception while keeping the load on a base station device low, since the intervals of the discontinuous reception are not changed unless a specific state occurs.

SUMMARY

According to an aspect of the present invention, provided is a base station device including a processor. The processor is configured to acquire first information on a first communication load of the base station device. The processor is configured to determine, on basis of the first information, whether a first event occurs. The processor is configured to acquire, upon determining that the first event occurs, second information on second communication loads of other base station devices located within a predetermined range from the base station device. The processor is configured to determine an impact range and an impact time of the first event on basis of the first information and the second information. The impact range is a range in which communication is affected by the first event. The impact time is a duration during which communication is affected by the first event. The processor is configured to instruct terminal devices within the impact range to change, during the impact time, a setting of discontinuous reception from a normal setting to a first setting for easier detection of an incoming call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating exemplary configurations of a DRX parameter control part and an event notification server according to a first embodiment;

FIG. 4 is a diagram for illustrating DRX parameters;

FIG. 5 is a diagram illustrating an example of an event type table;

FIG. 6 is a diagram illustrating an example of an event DRX parameter table;

DESCRIPTION OF EMBODIMENTS

Hereinafter, embodiments of a base station device, a radio access system, and a method of controlling the base station device are described in detail with reference to the accompanying drawings. Embodiments described below are not intended to limit the base station device, the radio access system, and the method of controlling the base station device.

First Embodiment

Figure 1:
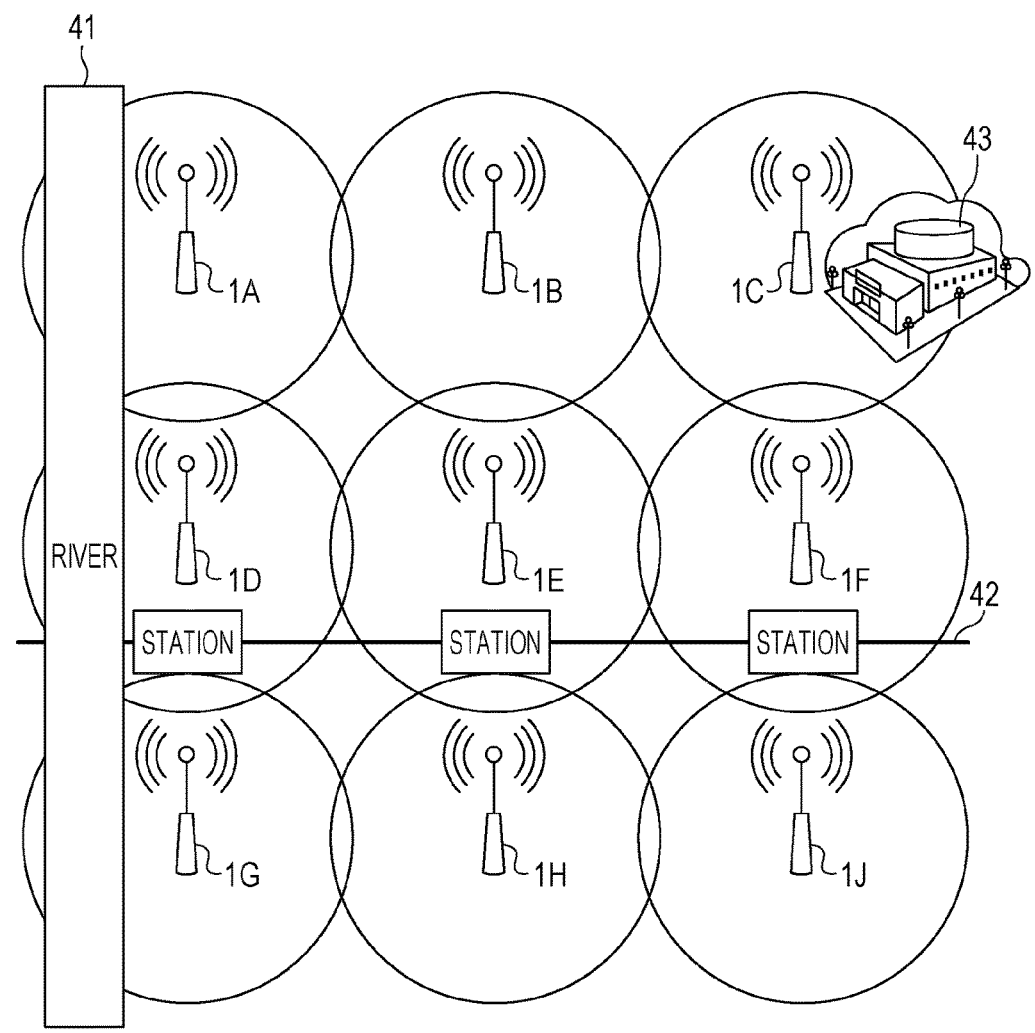
FIG. 1 diagram illustrating an example of an installed state of base station devices.

FIG. 1 illustrates an example of an installed state of base station devices. In FIG. 1, base station devices 1A to 1J are arranged. The base station devices 1A to 1J are arranged in the neighborhood of each other. The base station devices 1A, 1D, and 1G are arranged along a river 41. The base station devices 1D, 1E, and 1F are arranged near a station of a railway 42. The base station device 1C is arranged near an event site 43.

For example, when an event is held at the event site 43, communication by people staying in the event site increase rapidly, and thereby the number of UEs under control of the base station device 1C increases and communication traffic of the base station device 1C increases. Also, communication around the event site may be increased by people going to or back from the event. This may also increase communication of the base station devices 1B and 1F, which are arranged in the neighborhood of the base station device 1C.

Under these circumstances, a radio access system according to the first embodiment is configured to set discontinuous reception in an appropriate state by adjusting DRX parameters in view of an event occurrence, and thereby effectively save power consumption while keeping the load on the base station device low. The radio access system according to the present embodiment is described below in detail. Hereinafter, the base station devices 1A to 1J are simply referred to as the "base station device 1" unless they need to be distinguished from one another.

Figure 2:
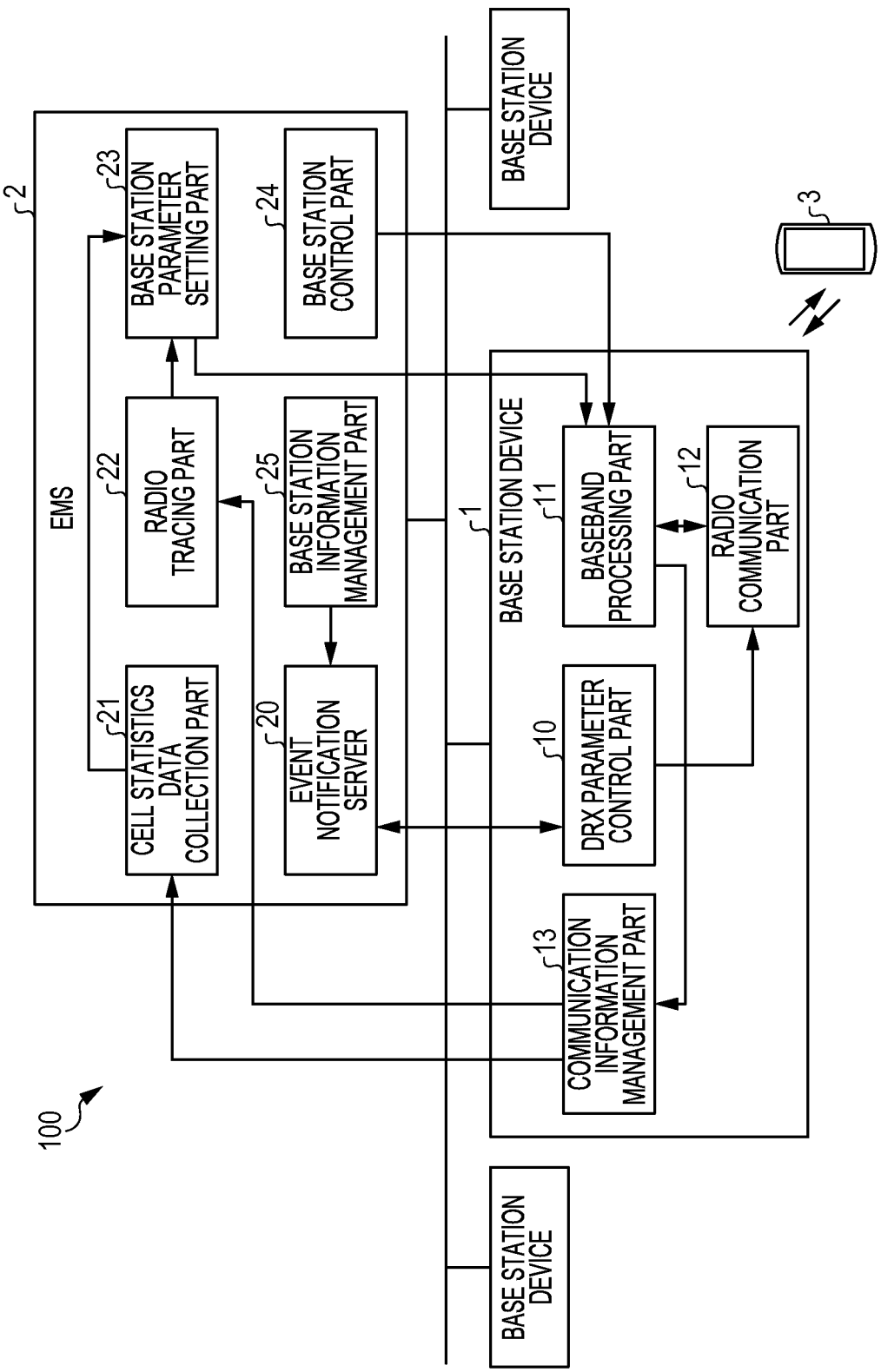
FIG. 2 is a diagram illustrating an exemplary configuration of a radio access system.

FIG. 2 illustrates an exemplary configuration of a radio access system according to the first embodiment. A radio access system 100 according to the present embodiment includes a base station device 1 and an element management system (EMS) 2. The EMS 2 is coupled to a plurality of base station devices 1 via a network. Then, the EMS 2 manages the coupled base station devices 1.

The base station device 1 includes a DRX parameter control part 10, a baseband processing part 11, a radio communication part 12, and a communication information management part 13.

The DRX parameter control part 10 determines DRX parameters on the basis of the communication state when there is no event occurrence. Then, the DRX parameter control part 10 notifies the determined DRX parameters to the radio communication part 12.

When an event occurs, the DRX parameter control part 10 receives, from an event notification server 20, DRX parameters (hereinafter referred to as "event DRX parameters") for responding to the communication resulting from the event occurrence. The DRX parameter control part 10 notifies the event DRX parameters to the radio communication part 12. Thus, the DRX parameter control part 10 controls a setting of discontinuous reception at a UE 3. The DRX parameter control part 10 is described below in detail. This event is an example of a "specific event".

The baseband processing part 11 performs coding and modulation of a signal received from a core network. Then, the baseband processing part 11 transmits the coded and modified signal to the radio communication part 12.

The baseband processing part 11 performs demodulation and decoding of a signal received from the radio communication part 12. The baseband processing part 11 transmits the demodulated and decoded signal to the core network.

The baseband processing part 11 measures signal intensity of a reception signal from the UE 3 under control thereof. Further, the baseband processing part 11 receives signal intensity of a transmission signal from the UE 3 under control thereof. Then, the baseband processing part 11 determines the communication state on the basis of the signal intensity of the reception signal and the signal intensity of the transmission signal, and controls handover of the UE 3.

The baseband processing part 11 transmits the signal intensity of the reception signal and the signal intensity of the transmission signal to the communication information management part 13. Further, the baseband processing part 11 transmits the call state, handover information, and a traffic amount to the communication information management part 13.

The radio communication part 12 receives a signal from the UE 3. The radio communication part 12 performs analog to digital (AD) conversion of the signal received from the UE 3. Further, the radio communication part 12 performs frequency conversion of the signal subjected to the AD conversion to generate a baseband signal. Then, the radio communication part 12 transmits the generated baseband signal to the baseband processing part 11.

The radio communication part 12 receives a signal from the baseband processing part 11. Then, the radio communication part 12 performs digital to analog (DA) conversion of the signal received from the baseband processing part 11. Further, the radio communication part 12 performs frequency conversion of the signal subjected to the DA conversion to generate a radio signal. Then, the radio communication part 12 transmits the generated radio signal to the UE 3.

Further, the radio communication part 12 receives input of the DRX parameters determined by the DRX parameter control part 10. Then, the radio communication part 12 transmits the received DRX parameters to the UE 3. Thus, the radio communication part 12 causes the UE 3 to perform discontinuous reception on the basis of the designated setting.

The communication information management part 13 acquires the signal intensity of the reception signal and transmission signal, the call state, the handover information, and the traffic amount from the baseband processing part 11. Then, the communication information management part 13 determines, for example, the number of succeeded transmissions and receptions, the number of failed transmissions and receptions, the number of call disconnections, the number of succeeded handovers and the number of failed handovers, and the traffic amount of each of UEs 3. Then, the communication information management part 13 transmits the number of succeeded transmissions and receptions, the number of failed transmissions and receptions, the number of call disconnections, the number of succeeded handovers, the number of failed handovers, and the traffic amount of each of UEs 3 to a cell statistics data collection part 21. The communication information management part 13 also transmits, for example, transmission power, reception power, and interference signal level, and so on to a radio tracing part 22.

The EMS 2 includes the event notification server 20, the cell statistics data collection part 21, the radio tracing part 22, a base station parameter setting part 23, a base station control part 24, and a base station information management part 25.

The event notification server 20 receives load information representing a communication load in the base station device 1 from the DRX parameter control part 10. The event notification server 20 receives load information from all of base station devices 1 under control of the EMS 2.

Then, the event notification server 20 determines on the basis of the received load information whether an event occurs. The event notification server 20 also determines on the basis of global data information received from an external device whether an event occurs. When an event occurs, the event notification server 20 identifies the type and impact scale of the event. Further, the event notification server 20 identifies an application range and an application time of the event DRX parameters. Then, the event notification server 20 transmits the event DRX parameters, the application range, and the application time to the DRX parameter control part 10. The event notification server 20 is described below in detail.

The cell statistics data collection part 21 receives the number of succeeded transmissions and receptions, the number of failed transmissions and receptions, the number of call disconnections, the number of succeeded handovers, the number of failed handovers, and the traffic amount from the communication information management part 13. Then, the cell statistics data collection part 21 statistically figures out the communication state between each of UEs 3 and the base station device 1. Thereafter, the cell statistics data collection part 21 transmits the determined communication state between each of UEs 3 and the base station device 1 to the base station parameter setting part 23.

The radio tracing part 22 receives the transmission power, the reception power, and the interference signal level from the communication information management part 13. Then, the radio tracing part 22 acquires quality data of a radio section. Thereafter, the radio tracing part 22 transmits the acquired quality data of the radio section to the base station parameter setting part 23.

The base station parameter setting part 23 receives the communication state between each of UEs 3 and the base station device 1 from the cell statistics data collection part 21. Also, the base station parameter setting part 23 receives the quality data of the radio section from the radio tracing part 22. Then, the base station parameter setting part 23 determines communication parameters such as a handover parameter of each base station device 1 on the basis of the communication state between each of UEs 3 and the base station device 1 and the quality data of the radio section so as to optimize an area quality. Then, the base station parameter setting part 23 transmits determined communication parameters to the baseband processing part 11 of each base station device 1.

The base station control part 24 determines a call restriction control during congestion, a closing control for maintenance of the base station device 1, and so on, and instructs the baseband processing part 11.

The base station information management part 25 stores topology information and location information of the base station device 1 managed by the EMS 2. For example, the base station information management part 25 receives input of the topology information of the base station device 1 managed by the EMS 2 from an administrator in advance and stores the received topology information. Also, the base station information management part 25 receives input of the location information from the administrator when setting the base station device 1 and stores the received location information.

Next, a DRX parameter control by the DRX parameter control part 10 and the event notification server 20 is described in detail with reference to FIG. 3. FIG. 3 illustrates a detail of the DRX parameter control part and the event notification server according to the first embodiment.

As illustrated in FIG. 3, the DRX parameter control part 10 includes a load information measuring part 101, an event information management part 102, and a parameter control part 103.

The load information measuring part 101 collects, as the load information, the number (hereinafter referred to as "number of connected UEs") of UEs 3 in the cell of the base station device 1, that is, under control thereof, and the communication traffic (hereinafter simply referred to as "communication traffic") between the base station device 1 and UEs 3 under control thereof. Then, the load information measuring part 101 aggregates load information collected every fixed time, and transmits to the event information management part 102.

The event information management part 102 receives the number of connected UEs and the communication traffic from the load information measuring part 101 every fixed time. Then, the event information management part 102 transmits the number of connected UEs and the communication traffic to a communication control part 201 of the event notification server 20 at fixed time intervals.

While a communication traffic and a number of connected UEs specified by the Performance Management are used as the load information in the present embodiment, other information specified by the Performance Management also may be used. Thus, by using information specified by the Performance Management as additional information, the event information management part 102 may transmit load information without a significant change to the base station device 1. Minimum granularity specified by the Performance Management is five minutes. Thus, for example, the event information management part 102 may transmit load information at intervals of five minutes.

The event information management part 102 receives event information regarding an event occurred within a cell of the base station device 1, from the communication control part 201 of the event notification server 20 described below. The event information includes, for example, the event DRX parameters and the application time. Then, the event information management part 102 transmits the received event information to the parameter control part 103.

The event information management part 102 receives notification of the event end from the communication control part 201. Then, the event information management part 102 notifies the parameter control part 103 of setting release of the event DRX parameters.

When there is no event occurrence, the parameter control part 103 instructs the UE 3 to set predetermined normal DRX parameters. Specifically, the parameter control part 103 notifies DRX parameters to the UE 3 by using a radio resource control (RRC) connection reconfiguration message.

Here, the DRX parameters are described with reference to FIG. 4. FIG. 4 illustrates the DRX parameters. In FIG. 4, the horizontal axis represents the elapse of time.

The DRX parameters include an on-duration timer T1, a short DRX cycle T2, a DRX short cycle timer T3, and a long DRX cycle T4. The DRX parameters also include a DRX inactivity timer T5. Further, the DRX parameters include a hybrid automatic repeat request (HARQ) round trip time (RTT) timer T6, and a DRX retransmission timer T7.

The on-duration timer T1 is a duration for monitoring physical downlink control channel (PDCCH) starting from the wake-up after a DRX sleep time. The short DRX cycle T2 is an interval between two adjacent on durations when the cycle is short. The long DRX cycle T4 is an interval between two adjacent on durations when the cycle is long. The DRX short cycle timer T3 is a duration for determining a change from the short DRX cycle to the long DRX cycle. When there is no data transmission and reception during the DRX short cycle timer T3, the DRX cycle is changed from the short DRX cycle T2 to the long DRX cycle T4. The DRX inactivity timer T5 is a duration for extending PDCCH monitoring when data transfer is detected. The HARQ RTT timer T6 is a duration before HARQ retransmission is performed. The DRX retransmission timer T7 is a duration for waiting for retransmission activated when the HARQ RTT timer T6 expires.

Here, the short DRX cycle T2 is set such that a value of the long DRX cycle T4 is acquired when the short DRX cycle T2 is multiplied by a predetermined integer. That is, when the parameter control part 103 transmits the value of the long DRX cycle T4 to the UE 3, the UE 3 may calculate the short DRX cycle T2.

The parameter control part 103 may cause the UE 3 to change the setting of discontinuous reception by instructing the UE 3 to change the setting of the DRX parameters described above.

Referring back to FIG. 3, description is continued below. The parameter control part 103 receives the event DRX parameters and the application time from the event information management part 102. Then, the parameter control part 103 instructs the UE 3 to set the event DRX parameters. Thereafter, the parameter control part 103 waits until the application time elapses. If release of the event DRX parameter setting is notified by the event information management part 102 before elapse of the application time, or if the application time has passed, the parameter control part 103 instructs UE 3 to set normal DRX parameters. The parameter control part 103 is an example of "setting control part".

Next, the event notification server 20 is described. The event notification server 20 includes the communication control part 201, a load information management part 202, an event occurrence determination part 203, and a global information acquisition part 204.

The communication control part 201 receives the communication traffic and the number of connected UEs from the DRX parameter control part 10 of each of base station devices 1 every fixed time. The communication control part 201 transmits the received communication traffic and the number of connected UEs to the load information management part 202.

When an event occurrence is determined by the event occurrence determination part 203, the communication control part 201 receives, from the event occurrence determination part 203, the event DRX parameters, the application range, and the application time, which are to be applied to each of the base station devices 1. Next, the communication control part 201 transmits the event DRX parameters and the application time to the DRX parameter control part 10 of each of the base station devices 1 designated by the application range by using an RRC connection reconfiguration message.

When the event end is determined by the event occurrence determination part 203, the communication control part 201 receives notification of the event end from the event occurrence determination part 203. Then, the communication control part 201 transmits notification of the event end to the DRX parameter control part 10. The communication control part 201 is an example of "setting instruction part".

The load information management part 202 receives, from the communication control part 201, the communication traffic and the number of connected UEs, which are load information transmitted from each of base station devices 1. Then, the load information management part 202 stores the communication traffic and the number of connected UEs for each of base station devices 1.

The global information acquisition part 204 acquires global data from an external device 4, for example, via the Internet. The global information acquisition part 204 transmits the acquired global data to the event occurrence determination part 203.

The global data is public information such as, for example, operation information of transportation systems, weather information, and disaster information. The global information acquisition part 204 may receive global data available, for example, from an information providing service by making an agreement therewith. The global information acquisition part 204 may acquire global data from a web page.

The event occurrence determination part 203 acquires the communication traffic and the number of connected UEs from the load information management part 202. The event occurrence determination part 203 receives the global data from the global information acquisition part 204.

The event occurrence determination part 203 determines a change rate between a present communication traffic and a preceding communication traffic. The event occurrence determination part 203 determines a change rate between a present number of connected UEs and a preceding number of connected UEs. Specifically, the event occurrence determination part 203 may determine a change rate a load by using a formula of (((present load)−(preceding load))/(preceding load))×100.

When the change rate between the present communication traffic and the preceding communication traffic and the change rate between the present number of connected UEs and the preceding number of connected UEs are equal to or higher than predetermined occurrence determination threshold values, the event occurrence determination part 203 determines that an event occurs.

The event occurrence determination part 203 calculate, in advance, an average communication traffic and an average number of connected UEs at the same time on the same day of the week in the past on the basis of communication traffics and numbers of connected UEs, which have been acquired so far. Then, the event occurrence determination part 203 determines a change rate between a present communication traffic and the past average communication traffic. The event occurrence determination part 203 also determines a change rate between a present number of connected UEs and a past average number of connected UEs. Specifically, the event occurrence determination part 203 may determine a change rate of a load by using a formula of (((present load)−(average load at same time on same day of the week in past))/(average load at same time on same day of the week in the past))×100.

When the change rate between the present communication traffic and the average communication traffic at the same time on the same day of the week in the past and the change rate between the present number of connected UEs and the average number of connected UEs at the same time on the same day of the week in the past are equal to or higher than the predetermined occurrence determination threshold values, the event occurrence determination part 203 determines that an event occurs.

Further, upon receiving global data from the global information acquisition part 204, the event occurrence determination part 203 determines that an event occurs.

Here, the event occurrence determination part 203 may detect the occurrence of an event in which the load amount changes sharply, by determining event occurrence on the basis of the change rate between the present load amount and the preceding load amount. Also, the event occurrence determination part 203 may detect the occurrence of an event in which the load amount changes moderately, by determining event occurrence on the basis of the change rate between the present load amount and the past average load amount. Also, the event occurrence determination part 203 may precisely determine the occurrence of an event by determining event occurrence with global data. Since an event whose occurrence may be determined with global data is limited to such an event for which global data is available, the event occurrence determination part 203 preferably determines event occurrence by using the global data and the change rate of the load amount in combination. Hereinafter, a base station device 1 where the occurrence of an event is determined is referred to as "base station device 1 with event occurrence".

Upon determining that an event occurs, the event occurrence determination part 203 then determines event DRX parameters, an application range, and an application time in accordance with a procedure described below. The event occurrence determination part 203 again acquires the communication traffic and the number of connected UEs of each of base station devices 1 from the load information management part 202. This is because the event occurrence determination part 203 may determine the event DRX parameters, application range, and application time more precisely by using newer information. However, if importance is attached to the reduction of processing and the speed rather than the precision, the event occurrence determination part 203 may use already acquired load information for determining the event DRX parameters, application range, and application time.

First, the event occurrence determination part 203 acquires the topology information of the base station devices 1 from the base station information management part 25. Then, by using the acquired topology information, the event occurrence determination part 203 identifies base station devices 1 within a predetermined range around the base station device 1 with event occurrence. Here, the base station devices 1 within the predetermined range are, for example, base station devices 1 located within a predetermined distance (for example, within an area away by less than few kilometers) from the base station device 1 with event occurrence.

Next, the event occurrence determination part 203 acquires information of the change rate of the communication traffic and the change rate of the number of connected UEs of each of the base station devices 1 within the predetermined range around the base station device 1 with event occurrence. Then, the event occurrence determination part 203 determines, as an event scale, a range covering base station devices 1 having the change rate of the communication traffic and the change rate of the number of connected UEs being equal to or higher than scale determination threshold values. The event scale may be represented, for example, by an area or a distance. The scale determination threshold values are values which may allow to determine that the change rate is affected by the event. The values thereof are smaller when compared with the occurrence determination threshold values.

Next, the event occurrence determination part 203 identifies base station devices 1 (hereinafter simply referred to as "nearby base station devices 1") in the neighborhood of the base station device 1 with event occurrence. Here, the nearby base station devices 1 are base station devices 1 within a predetermined range, such as, for example, base station devices 1 adjacent to the base station device 1 with event occurrence, or base station devices 1 including base station devices 1 next to the adjacent base station devices 1. The range of the nearby base station devices 1 is preferably smaller than the predetermined range around the base station device 1 with event occurrence when determining the event scale.

Then, the event occurrence determination part 203 acquires information of a change rate of the communication traffic and a change rate of the number of connected UEs of the nearby base station devices 1. Specifically, the event occurrence determination part 203 calculates an average value of change rates of the communication traffic and an average value of change rates of the number of connected UEs of the identified nearby base station devices 1, and determines the calculated average values respectively as the change rate of the communication traffic and the change rate of the number of connected UEs of the nearby base station devices 1.

The event occurrence determination part 203 has an event type table 301 as illustrated in FIG. 5. FIG. 5 illustrates an example of an event type table. A change rate 311 of the number of connected UEs represents a change rate of the number of connected UEs in the base station device 1 with event occurrence. A change rate 312 of the communication traffic represents a change rate of the communication traffic in the base station device 1 with event occurrence. A change rate 313 of the number of connected UEs of nearby eNBs represents a change rate of the number of connected UEs in nearby base station devices 1. A change rate 314 of the communication traffic of nearby eNBs represents a change rate of the communication traffic in nearby base station devices 1. The event occurrence determination part 203 has, as the event type table 301, two kinds of tables, that is, a table using a change rate between a present load amount and a preceding load amount, and a table using a change rate between a present load amount and a past average load amount. Thus, both an event having a rapidly changing load amount and an event having a moderately changing load amount may be identified. The event type table 301 may be used for any of the base station devices 1 by normalizing the load amount in the calculation of the change rate.

When each of the acquired values is within a predetermined range of each value in one of the event types listed in the event type table 301, the event occurrence determination part 203 determines the event type as an event type of the occurred event.

Further, the event occurrence determination part 203 has an event DRX parameter table 302 illustrated in FIG. 6. FIG. 6 illustrates an example of an event DRX parameter table.

The event DRX parameter table 302 registers DRX parameters to be applied when an event of a specific event type occurs.

The event occurrence determination part 203 acquires DRX parameters corresponding to the identified event type from the event DRX parameter table 302.

Figure 7A:
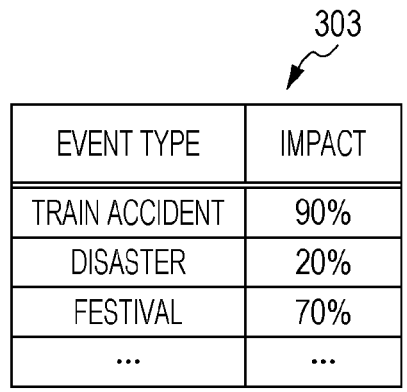
FIG. 7A is a diagram illustrating an example of an event impact table.
Figure 7B:
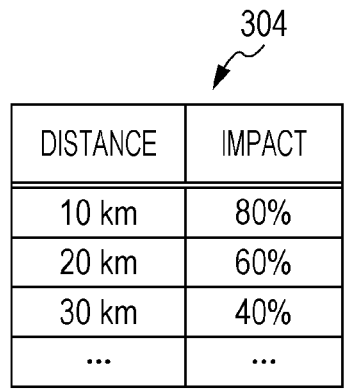
FIG. 7B is a diagram illustrating an example of a distance impact table.

Further, the event occurrence determination part 203 has an event impact table 303 illustrated in FIG. 7A and a distance impact table 304 illustrated in FIG. 7B. FIG. 7A illustrates an example of an event impact table. FIG. 7B illustrates an example of a distance impact table. The event impact table 303 indicates an impact made on each of the base station devices 1 when an event occurs. The distance impact table 304 indicates an impact corresponding to the distance from the base station device 1 with event occurrence.

The event occurrence determination part 203 identifies, on the basis of topology information of base station devices 1 acquired from the base station information management part 25, base station devices 1 around the base station device 1 with event occurrence, as targets of determining the application range of the event DRX parameters. The event occurrence determination part 203 may determine all base station devices 1 as the determination targets. However, to simplify the processing, it is preferable to narrow down the determination targets to a specific range. This range is preferably determined in view of a balance between a range which may be impacted by the event, and simplification of the processing.

Next, the event occurrence determination part 203 calculates a distance of each of base station devices 1 identified as the determination targets from the base station device 1 with event occurrence, on the basis of location information of each of base station devices 1 maintained by the base station information management part 25. Then, the event occurrence determination part 203 determines a distance impact in each of target base station devices 1 identified as the determination targets on the basis of the calculated distance by using the distance impact table 304. For example, when an event occurs in the base station device 1F of FIG. 1, the event occurrence determination part 203 determines that a base station device 1A has a distance impact of 40%, the base station device 1B has a distance impact of 60%, and the base station device 1C has a distance impact of 80%.

Further, the event occurrence determination part 203 acquires an event impact of each of target base station devices 1 identified as the determination targets from the event impact table 303. Then, the event occurrence determination part 203 multiplies the event impact, the distance impact, and the event scale, for example, for each of the base station devices 1 identified as the determination targets. If the multiplication result for a base station device 1 is equal to or larger than a predetermined application determination threshold value, the event occurrence determination part 203 determines that the event DRX parameters are to be applied to the base station device 1. Thus, the event occurrence determination part 203 determines the application range of the event DRX parameters.

Here, reason for determining base station devices 1 to which the event DRX parameters are to be applied on the basis of the event impact, the distance impact, and the event scale is described. There is a high possibility that impact of an event becomes less at a location further away from an event source. Thus, the distance from the event source is used as a material for determining the extent of the event impact on each of base station devices 1.

The distribution of impact may be characterized depending on an event type. For example, impact of a train accident is high in base station devices 1 located around a railway, while the impact may be low in base station devices 1 even in the neighborhood of the base station device 1 where an accident occurs, if the base station devices 1 are not located around the railway. Thus, the event impact representing the impact of each of event types is used as a material for determining the extent of event impact on each of base station devices 1.

There is a high possibility that a same event of a larger scale may give an impact to base station devices 1 in a wider range. For example, an impact range of a traffic jam may vary depending on the length (scale) of the traffic jam. Thus, the event scale is used as a material for determining the extent of event impact on each of base station devices 1.

Figure 8:
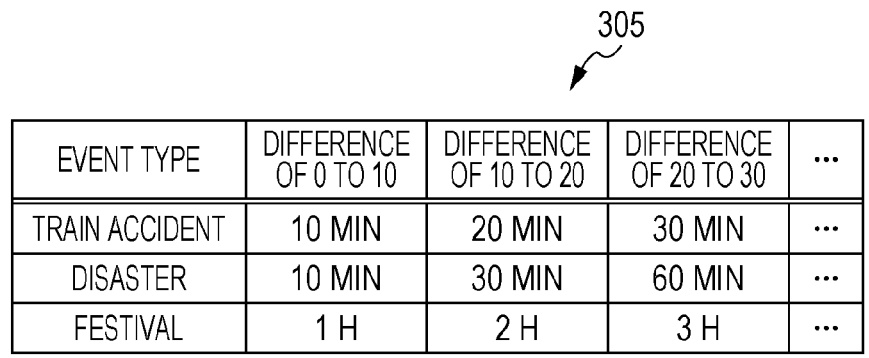
FIG. 8 is a diagram illustrating an example of an application time table.

Here, description of the event occurrence determination part 203 is resumed. The event occurrence determination part 203 has an application time table 305 as illustrated in FIG. 8. FIG. 8 illustrates an example of an application time table. Each of the differences 10 to 30 in the application time table 305 represents a difference of the multiplication result of the event impact, the distance impact, and the event scale, from an application determination threshold value.

The event occurrence determination part 203 calculates a difference of the multiplication result of the event impact, the distance impact, and the event scale from the application determination threshold value for each of base station devices 1 within the application range. Then, the event occurrence determination part 203 determines the application time of the event DRX parameters for each of base station devices 1 within the application range on the basis of the application time table 305 by using the type of the occurred event and the calculated difference.

Then, the event occurrence determination part 203 notifies the communication control part 201 of the event DRX parameters, the application range, and the application time for each of the base station devices 1. The event occurrence determination part 203 is an example of a "determination part".

Figure 9:
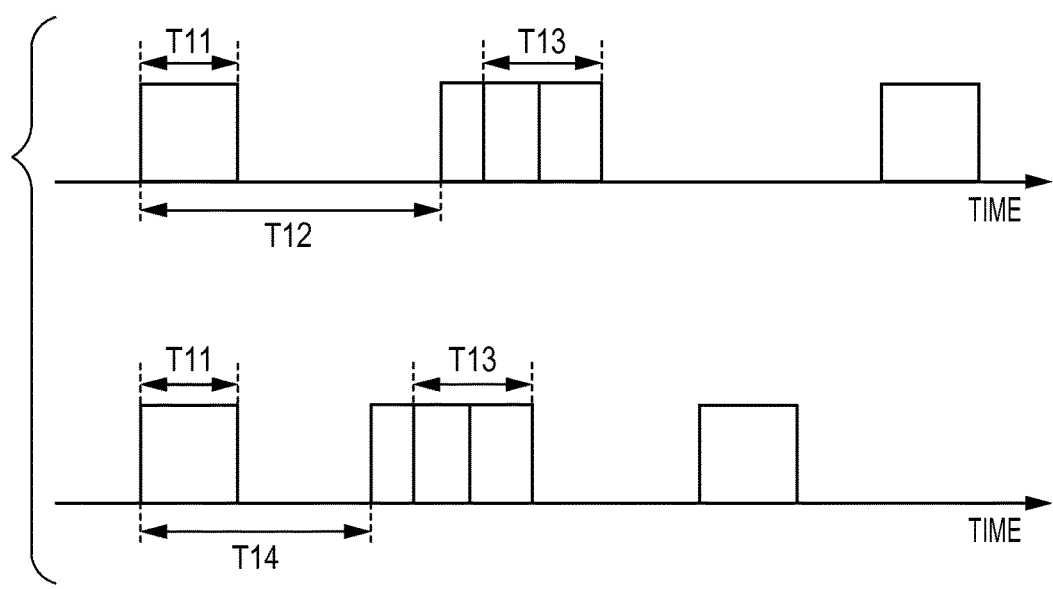
FIG. 9 is a diagram illustrating an example of DRX parameters upon occurrence of an event.

Here, a change of the DRX parameters upon occurrence of event is described with reference to FIG. 9. FIG. 9 illustrates an example of the DRX parameters upon occurrence of event. In FIG. 9, the horizontal axis represents the elapse of time. An upper diagram of FIG. 9 illustrates normal DRX parameters, while a lower diagram of FIG. 9 illustrates DRX parameters when a train accident occurs. Here, a case where a train accident occurs is described as a specific example.

Railway information may be transmitted and received between users in the route where a train accident occurs and a base station device 1. However, this may be transient, and once people using the route where the train accident occurs have acquired information that operation diagram is in disorder, data communication might not occur frequently. In a certain time zone (such as a commute time), delay of the train causes the station yard to be crowded with people, and as a result, a large number of UEs may exist in an area including the station. In view of the foregoing, when a train accident occurs, it is preferable to reduce the short DRX cycle such that the UEs may increase the power-off duration immediately after completion of the communication. Therefore, the DRX parameters are changed as described below.

As illustrated in FIG. 9, an on-duration time T11, a short DRX cycle T12, and a DRX inactivity timer T13 are set to the UEs 3 as DRX parameters before the occurrence of an event. In this state, when a train accident occurs, the setting of the on-duration time T11 and the DRX inactivity timer T13 is maintained as they are. On the other hand, the setting of the short DRX cycle T12 is changed to a short DRX cycle T14 which is shorter than the short DRX cycle T12. In this case, the DRX short cycle timer may be shortened.

Thus, by changing the DRX parameters, optimum DRX parameter values may be set even under a special environment with event occurrence, while providing an optimum communication environment. As the setting of the DRX parameters for the occurrence of an event having high urgency, the DRX parameters also may be set so as to increase the power-on duration.

Figure 10:
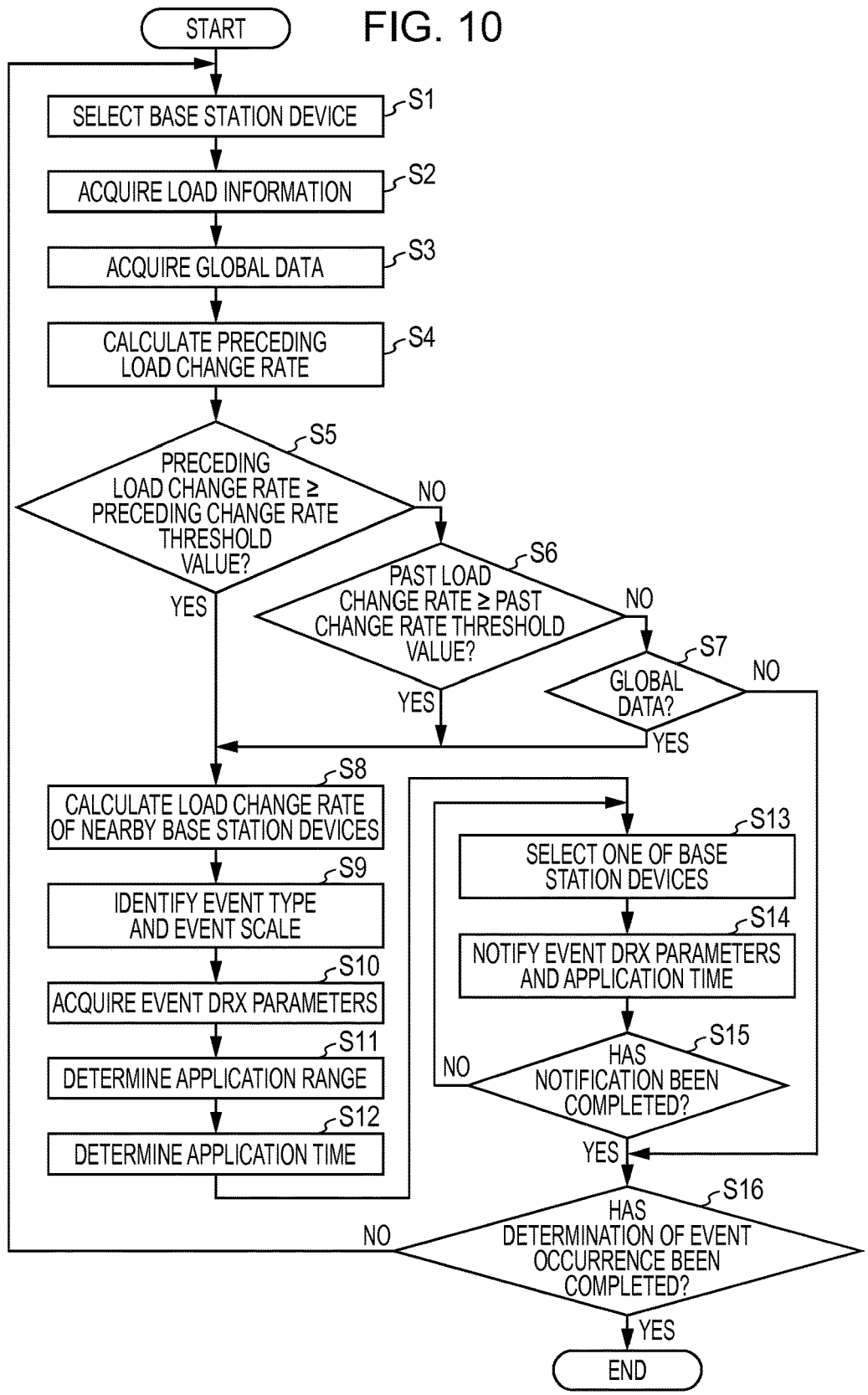
FIG. 10 is a flowchart of event DRX parameter setting in a radio access system according to a first embodiment.

Next, a flow of the event DRX parameter setting in the radio access system 100 according to the first embodiment is described with reference to FIG. 10. FIG. 10 is a flowchart illustrating the event DRX parameter setting in the radio access system 100 according to the first embodiment.

The event occurrence determination part 203 selects a base station device 1 for which event occurrence is determined (S1).

Next, the event occurrence determination part 203 acquires, from the load information management part 202, the communication traffic and the number of connected UEs, which are load information of the selected base station device 1 (S2). Hereinafter, the communication traffic and the number of connected UEs are collectively referred to as "load".

Next, the event occurrence determination part 203 acquires global data from the global information acquisition part 204 (S3).

Next, the event occurrence determination part 203 calculates a preceding load change rate which is a change rate between a present load and a preceding load (S4). Then, the event occurrence determination part 203 determines whether the preceding load change rate is equal to or larger than a preceding change rate threshold value (S5). If the preceding load change rate is equal to or larger than the preceding change rate threshold value (S5: Yes), the event occurrence determination part 203 proceeds to S8.

If the preceding load change rate is smaller than the preceding change rate threshold value (S5: No), the event occurrence determination part 203 calculates a past load change rate which is a change rate between the present load and a past average load. Then, the event occurrence determination part 203 determines whether the past load change rate is equal to or larger than a past change rate threshold value (S6). If the past load change rate is equal to or larger than the past change rate threshold value (S6: Yes), the event occurrence determination part 203 proceeds to S8.

If the past load change rate is smaller than the past change rate threshold value (S6: No), the event occurrence determination part 203 determines whether global data notifying the occurrence of an event is received (S7). If the global data is not received (S7: No), the event occurrence determination part 203 determines that no event occurs in the area of the base station device 1, and proceeds to S16.

If the global data is received (S7: Yes), the event occurrence determination part 203 proceeds to S8.

The event occurrence determination part 203 again acquires the communication traffic and the number of connected UEs of each of base station devices 1 from the load information management part 202. Then, the event occurrence determination part 203 calculates the load change rate of nearby base station devices 1 of the base station device 1 with event occurrence (S8).

Next, the event occurrence determination part 203 identifies the event scale on the basis of load change rates of the nearby base station devices 1. Further, the event occurrence determination part 203 identifies the event type of the occurred event from an event type table 301 by using a load change rate of the base station device 1 with event occurrence and load change rates of the nearby base station devices 1 (S9).

Next, the event occurrence determination part 203 acquires event DRX parameters corresponding to the identified event type from the event DRX parameter table 302 (S10).

Next, the event occurrence determination part 203 identifies target base station devices 1 of determining the application range of the event DRX parameters. Then, the event occurrence determination part 203 acquires a distance impact for each of determination target base station devices 1 from the distance impact table 304. Further, the event occurrence determination part 203 acquires the event impact for each of determination target base station devices 1 from the event impact table 303. Then, the event occurrence determination part 203 determines, out of the determination target base station devices 1, base station devices 1 having a multiplication result of the event impact, the distance impact, and the event scale equal to or larger than an application determination threshold value, as the application range of the event DRX parameters (S11).

Further, the event occurrence determination part 203 determines a difference of the multiplication result of the event impact, the distance impact, and the event scale from the application determination threshold value for each of base station devices 1 within the application range. Then, the event occurrence determination part 203 determines the application time of the DRX parameters for each of base station devices 1 within the application range from an application time table 305 by using the determined difference (S12).

Next, the event occurrence determination part 203 selects one of the base station devices 1 included in the application range (S13). Then, the event occurrence determination part 203 notifies the event DRX parameters and the application time to the selected base station device 1 (S14).

Then, the event occurrence determination part 203 determines whether notification to all of the base station devices 1 within the application range has completed (S15). If there is a base station device 1 not yet notified (S15: No), the event occurrence determination part 203 returns to S13.

If notification to all of the base station devices 1 within the application range has completed (S15: Yes), the event occurrence determination part 203 determines whether the determination of event occurrence has completed for all base station devices 1 (S16). If there is a base station device 1 for which the determination of event occurrence has not yet completed (S16: No), the event occurrence determination part 203 returns to S1. If the determination of event occurrence has completed for all base station devices 1 (S16: Yes), the event occurrence determination part 203 ends the event occurrence determination.

Figure 11:
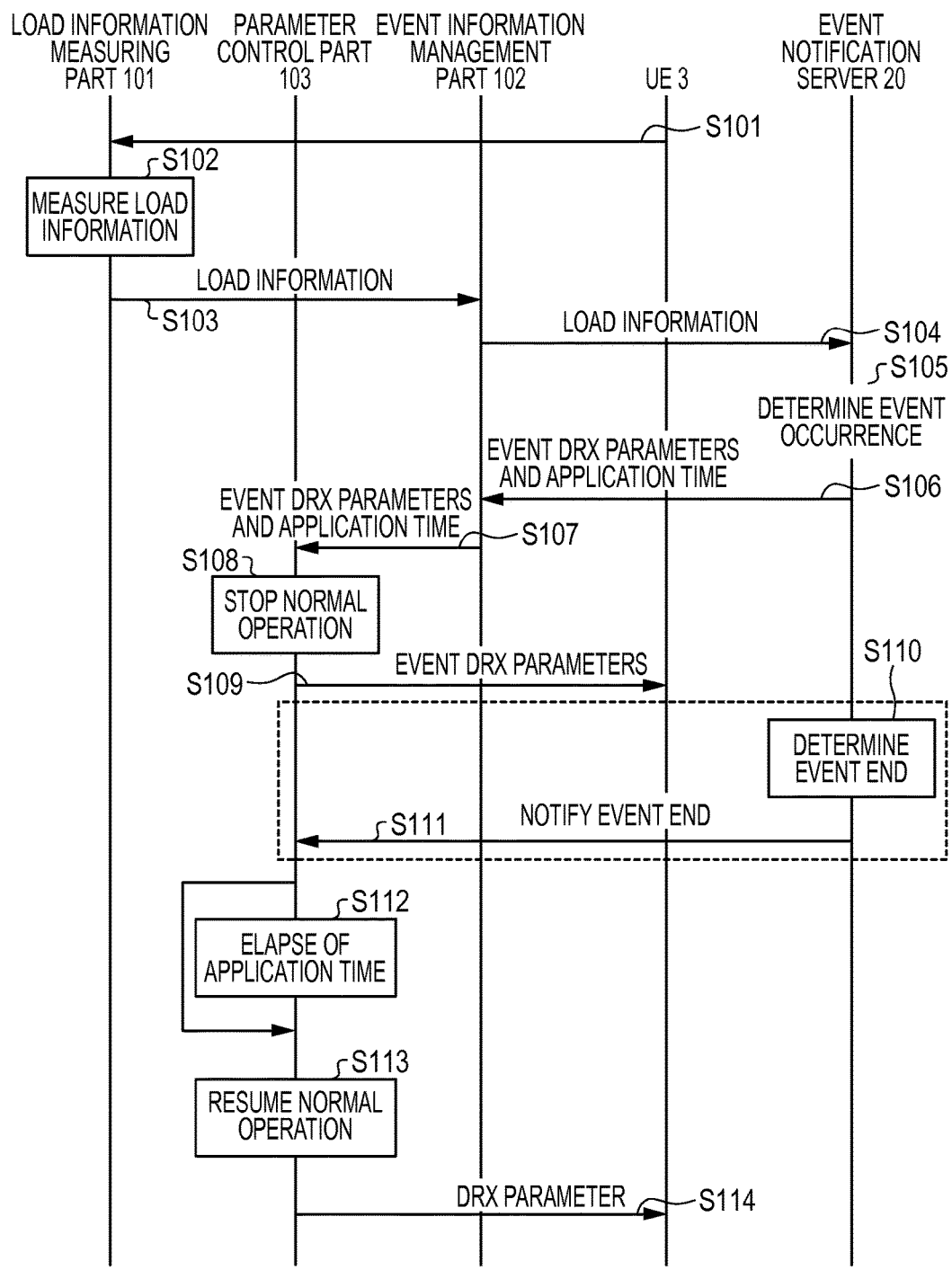
FIG. 11 is a sequence diagram of processing from event occurrence to reset of DRX parameters by a radio access system according to a first embodiment.

Next, a flow of processing from event occurrence to reset of the DRX parameters is described with reference to FIG. 11. FIG. 11 is a sequence diagram illustrating processing from event occurrence to reset of the DRX parameters by the radio access system according to the first embodiment. Here, the communication traffic and the number of connected UEs are collectively expressed as a load.

The load information measuring part 101 monitors communication between the base station device 1 and the UE 3 (S101). Then, the load information measuring part 101 measures load information (S102).

Next, the load information measuring part 101 transmits the measured load information to the event information management part 102 (S103).

The event information management part 102 receives the load information from the load information measuring part 101. Then, the event information management part 102 transmits the load information to the event notification server 20 every fixed time (S104).

The event notification server 20 acquires the load information from the event information management part 102 every fixed time. Then, the event notification server 20 determines event occurrence in the base station device 1 on the basis of the acquired load information (S105). In this case, assume that an event occurs. In determining event occurrence, the event notification server 20 determines the event DRX parameters and the application time.

The event notification server 20 notifies the event DRX parameters and the application time to the event information management part 102 (S106).

The event information management part 102 notifies the event DRX parameters and the application time to the parameter control part 103 (S107).

Upon receiving the event DRX parameters and the application time from the event information management part 102, the parameter control part 103 stops normal operation of instructing setting of predetermined DRX parameters (S108). Then, the parameter control part 103 instructs the UE 3 to set the event DRX parameters (S109). The UE 3 performs discontinuous reception by using the event DRX parameters.

The event notification server 20 determines the event end on the basis of a development of the change rate (S110). Then, the event notification server 20 notifies the event end to the parameter control part 103 (S111). Upon receiving notification of the event end, the parameter control part 103 proceeds to S113 without waiting for elapse of the application time. However, the processing in a portion enclosed by a broken line is performed when the event notification server 20 determines that the event has ended, and not performed when the event has not ended.

If notification of the event end is not received, the parameter control part 103 waits until elapse of the application time (S112).

When notification of the event end is received or if the application time has elapsed, the parameter control part 103 resumes the normal operation (S113). Then, the parameter control part 103 transmits predetermined DRX parameters to the UE 3 (S114).

Figure 12:
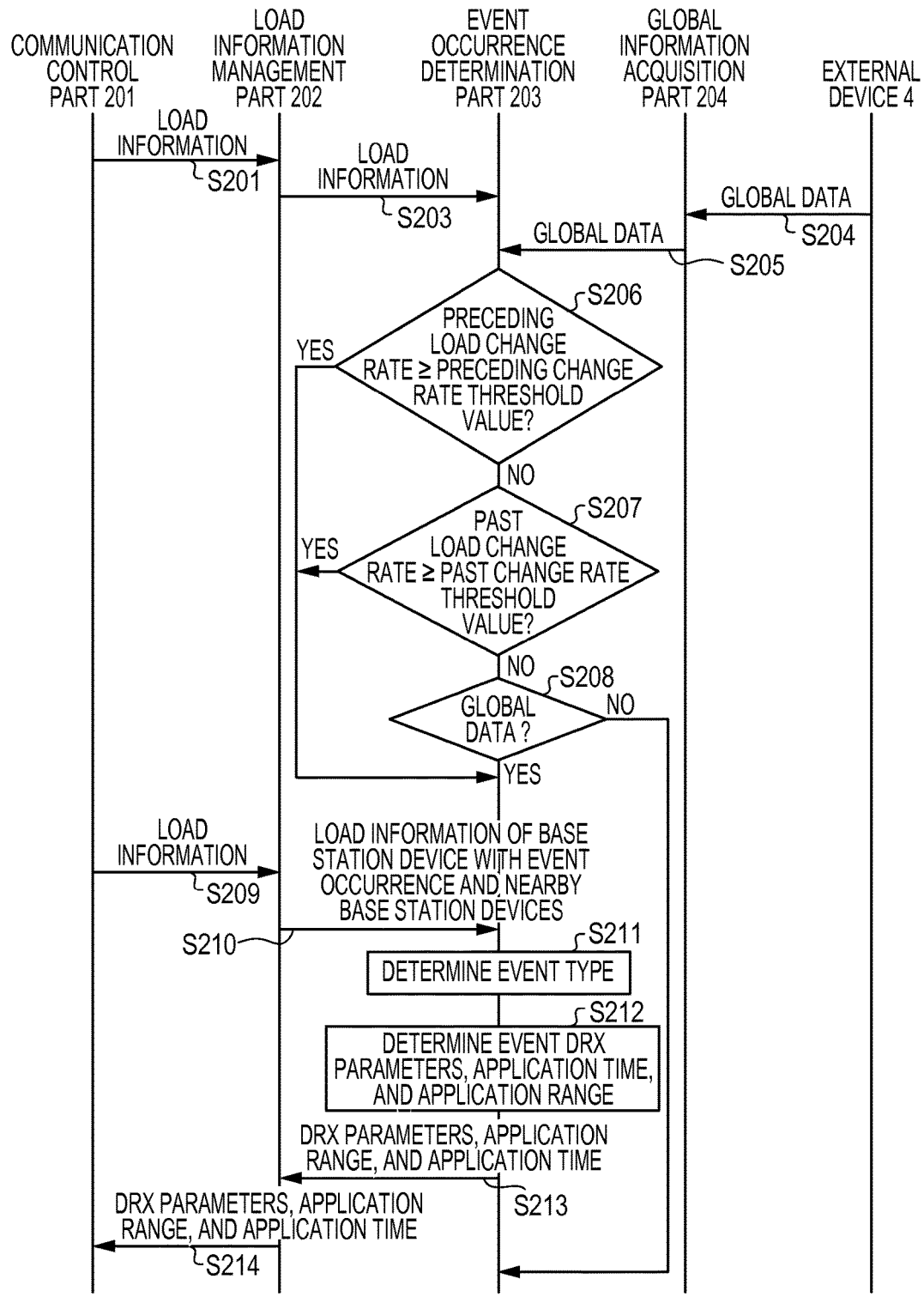
FIG. 12 is a sequence diagram of event occurrence determination by an event notification server.

Next, a flow of the event occurrence determination by the event notification server 20 is described with reference to FIG. 12. FIG. 12 is a sequence diagram of event occurrence determination by an event notification server. The sequence diagram of FIG. 12 is an example of the processing in S105 of FIG. 11.

The communication control part 201 transmits load information of each of UEs 3, which is received from the base station device 1, to the load information management part 202 (S201). The load information management part 202 stores the received load information. Then, the event occurrence determination part 203 acquires load information from the load information management part 202 (S203).

The global information acquisition part 204 acquires global data notifying an event occurrence from the external device 4 (S204). Next, the event occurrence determination part 203 acquires the global data from the global information acquisition part 204 (S205).

Next, the event occurrence determination part 203 calculates the preceding load change rate. Then, the event occurrence determination part 203 determines whether the preceding load change rate is equal to or larger than a preceding change rate threshold value (S206). If the preceding load change rate is equal to or larger than the preceding change rate threshold value (S206: Yes), the event occurrence determination part 203 determines that an event occurs, and proceeds to processing following S208.

If the preceding load change rate is smaller than the preceding change rate threshold value (S206: No), the event occurrence determination part 203 calculates a past load change rate. Then, the event occurrence determination part 203 determines whether the past load change rate is equal to or larger than the past change rate threshold value (S207). If the past load change rate is equal to or larger than the past change rate threshold value (S207: Yes), the event occurrence determination part 203 determines that an event occurs, and proceeds to the processing following S208.

If the past load change rate is smaller than the past change rate threshold value (S207: No), the event occurrence determination part 203 determines whether global data notifying occurrence of an event is received (S208). If the global data is not received (S208: No), the event occurrence determination part 203 determines that no event occurs in an area of the base station device 1, and ends the event occurrence determination.

If the global data is received (S208: Yes), the event occurrence determination part 203 determines that an event occurs, and proceeds to the processing following S208.

The load information management part 202 receives load information from the communication control part 201 (S209).

The event occurrence determination part 203 acquires load information of the base station device with event occurrence and nearby base station devices 1 from the load information management part 202 (S210).

Next, the event occurrence determination part 203 determines the event type from the event type table 301 by using the acquired load information (S211).

Next, the event occurrence determination part 203 determines event DRX parameters from the event DRX parameter table 302 by using the event type. Further, the event occurrence determination part 203 determines the application range and the application time by using the event impact table 303 and the distance impact table 304 (S212). Then, the event occurrence determination part 203 notifies the event DRX parameters, the application time, and the application range to the load information management part 202 (S213).

The load information management part 202 notifies the event DRX parameters, the application time, and the application range to the communication control part 201 (S214). Thereafter, the communication control part 201 notifies the event DRX parameters, the application time, and the application range to the DRX parameter control part 10 of the base station device 1.

As described above, the radio access system according to the present embodiment detects the occurrence of an event from a change of the communication load in each of base station devices, and determines an impact range and an impact time of the event on the basis of the detected event. Then, the radio access system causes base station devices within the determined impact range to apply the DRX parameters based on the event type for the impact time. Thus, when an event occurs, discontinuous reception intervals of UEs which may be affected by the occurrence of the event may be changed on the basis of the event, and thereby power consumption saving may be achieved in an effective manner while the load on the base station device is kept low.

Further, use of load information from multiple base station devices allows for prompt determination of the event occurrence. Then, DRX parameters appropriate for the event are notified in advance to a base station device in which impact of the event is expected. This allows the UEs under control of the base station device to change to optimum DRX parameters at a timing when the load tendency changes. Use of load information from multiple base station devices also allows estimation of the event scale. Further, use of global information in addition to the load information from multiple base station devices improves determination accuracy of the event type.

Here, setting of specific event DRX parameters and event determination for various events are described.

In a case of a train accident, for example, the operation diagram will be disturbed when the train accident occurs, and thereby communication will increase due to provision of a service notifying the operation state to users. However, once information of the train operation state has been provided to users, subsequent notification to users would not occur so frequently. Therefore, it may be said that this increase of communication is highly transient. Thus, a ratio of the reception period in the discontinuous reception immediately after the occurrence of the accident may be increased, and a ratio of the reception time thereafter may be reduced to some extent. Since a train accident also affects other users utilizing the same route, impact of the event will spread to base station devices located on the same route. Thus, the impact range of the event may be identified more accurately by detecting the event at multiple base station devices.

The disaster information is considered highly urgent and highly cyclic. That is, when a disaster occurs, it is preferable to communicate information immediately, and after the occurrence of the event, a change in the disaster state will be notified at regular intervals. Also, it is preferable that, when there is a change in the disaster state, the information be communicate immediately. For this reason, when a disaster occurs, the ratio of the reception time in the discontinuous reception may be preferably increased over a prolonged period of time. Further, since the disaster information is highly urgent, it is preferable to also notify the information to users in a communication area of nearby base station devices around the location where the disaster occurs. Therefore, the disaster information may be notified in a more reliable manner by determining the application range of the event DRX parameters and then instructing base station devices within the application range to increase the ratio of the reception time in the discontinuous reception.

In a case of a festival, the festival information, which includes a notice of event holding, coupon, image information, and so on, may be communicated to surrounding people of the festival site. Therefore, a festival is considered as an event involving highly cyclic transfer of a large amount of data. Thus, in the case of the festival, it is preferable to significantly increase the ratio of the reception period of the discontinuous reception periodically. Also, in the case of the festival, communication may occur not only in the area where a festival is held but also in a wider area intended to involve surrounding people. Therefore, appropriate communication environment may be established by setting the DRX parameters so as to respond to generated communication on the basis of the event detection by multiple base station devices.

Second Embodiment

Figure 13:
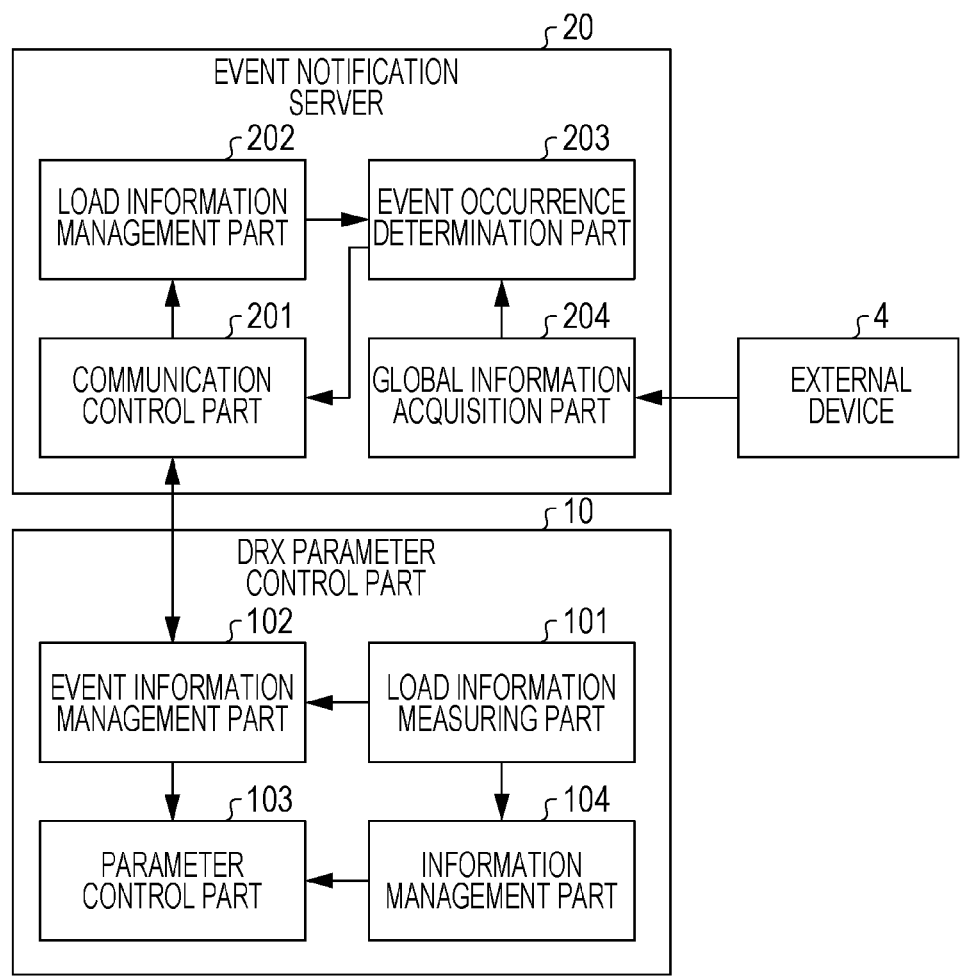
FIG. 13 is a diagram illustrating exemplary configurations of a DRX parameter control part and an event notification server according to a second embodiment.

FIG. 13 illustrates a detail of the DRX parameter control part and the event notification server according to the second embodiment. In contrast to the DRX parameter control part 10 according to the first embodiment, a DRX parameter control part 10 according to the second embodiment determines the DRX parameters on the basis of past statistical information when there is no event occurrence. The DRX parameter control part 10 according to the second embodiment includes an information management part 104 in addition to components of the first embodiment. Hereinafter, description of components having functions similar to the first embodiment is omitted.

As an example of no event occurrence, a case where a base station device 1 is installed in an office is described. For the base station device 1 installed in the office, there is a tendency that use frequency is high during a lunch break or after working hours, and low during working hours. Thus, when use frequency varies depending on a time zone, power consumption may be saved by changing the DRX parameters according to the time zone.

Figure 14:
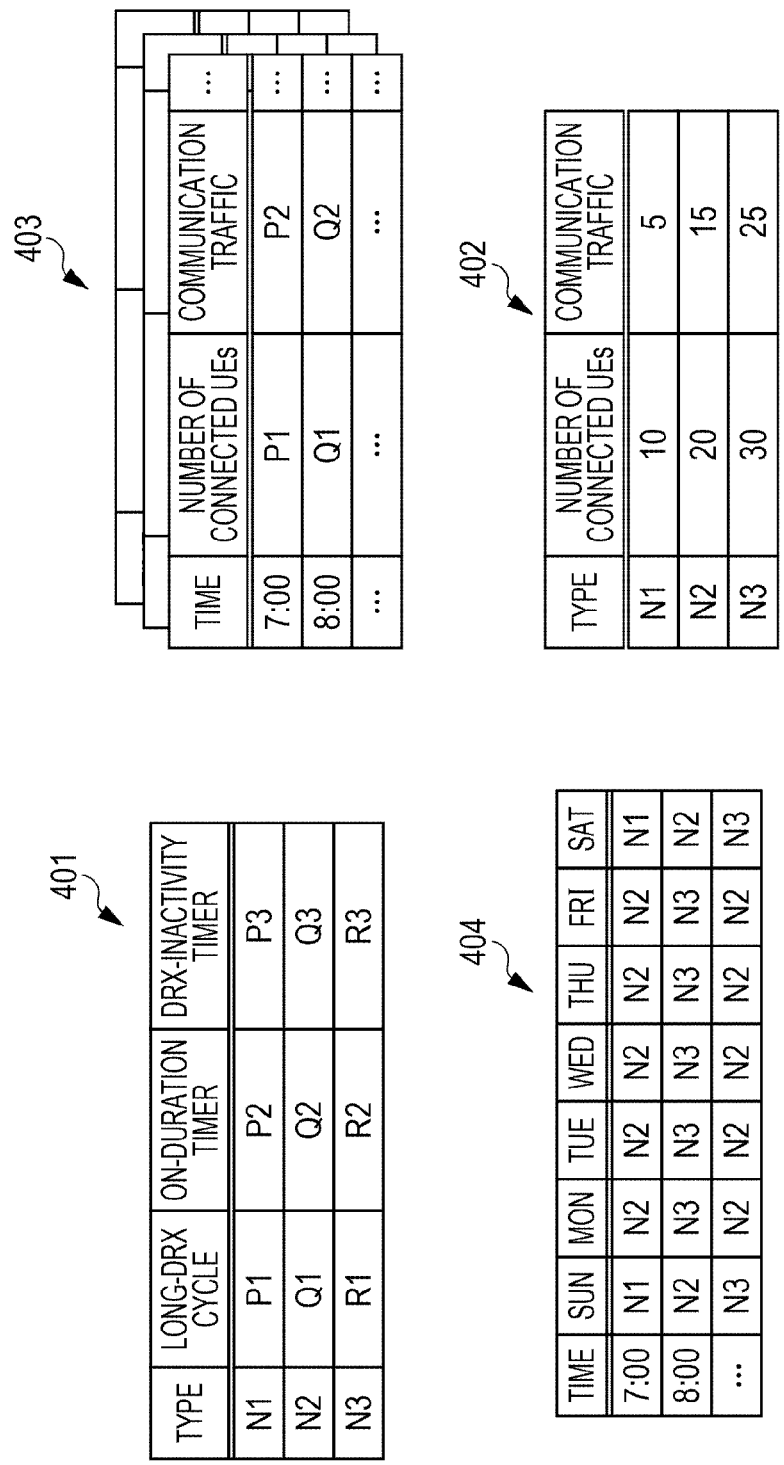
FIG. 14 is a diagram illustrating a method of determining DRX parameters according to a time zone.

Thus, a method of determining the DRX parameters according to the time zone is described with reference to FIG. 14. FIG. 14 illustrates a method of determining the DRX parameters according to the time zone.

The information management part 104 stores a DRX parameter table 401 in which DRX parameters applied to each of parameter combination types are registered. Further, the information management part 104 stores an application type table 402 in which the number of connected UEs and the communication traffic are registered for each of the parameter combination types.

At a load information update timing, the information management part 104 receives load information from the load information measuring part 101 of each of the UEs 3 under control of the base station device 1. Then, the information management part 104 calculates an average value of the number of connected UEs and an average value of the communication traffic received from the load information measuring part 101 for each combination of a day of the week and a time zone. Then, the information management part 104 creates, for each day of the week, a load information table 403 of the calculated values for each time zone.

Then, the information management part 104 acquires the number of connected UEs and the communication traffic for each time zone of each day of the week from the load information table 403. Next, the information management part 104 acquires a parameter combination type having a high similarity of the number of connected UEs and the communication traffic for each time zone of each day of the week from the application type table 402. Then, the information management part 104 determines the acquired parameter combination type as a parameter combination type to be used for each time zone of each day of the week. Then, the information management part 104 generates an application parameter determination table 404 in which a parameter combination type determined for each time zone of each day of the week is registered.

The parameter control part 103 waits until a DRX parameter change timing. The DRX parameter change timing is a start timing of each time zone. At the DRX parameter change timing, the parameter control part 103 acquires a parameter combination type corresponding to the time zone of the day of the week with reference to an application parameter determination table 404 of the information management part 104. Further, the parameter control part 103 acquires DRX parameters corresponding to the acquired parameter combination type from the DRX parameter table 401.

Thereafter, the parameter control part 103 instructs the UE 3 to set the acquired DRX parameters. Thus, the setting of discontinuous reception of the UE 3 is changed. Hereinafter, the setting of the DRX parameters for each time zone with information of the information management part 104 is referred to as a DRX parameter setting with statistical information.

Upon receiving the event DRX parameters from the event information management part 102 due to the occurrence of an event, the parameter control part 103 suspends the DRX parameter setting with statistical information. Then, the parameter control part 103 instructs the UE 3 to set the event DRX parameters. When notification of the event end is received or if the application time has elapsed, the parameter control part 103 resumes the DRX parameter setting with statistical information.

Figure 15:
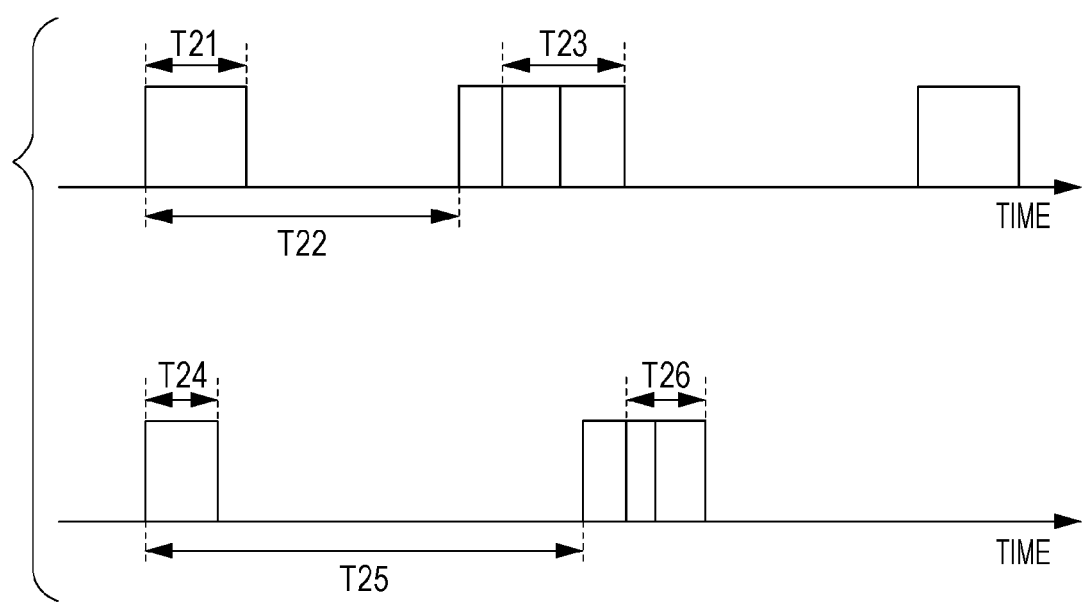
FIG. 15 is a diagram illustrating an example of DRX parameters set with statistical information.

Here, an example of the DRX parameters set with statistical information is described with reference to FIG. 15. FIG. 15 illustrates an example of the DRX parameters set with statistical information. In FIG. 15, the horizontal axis represents the elapse of time. In FIG. 15, an upper diagram illustrates DRX parameters when communication frequency is high, while a lower diagram illustrates DRX parameters when communication frequency is low. Here, as a specific example, a case where the base station device 1 is installed in an office is described.

When communication traffic increases such as in the lunch break, an on-duration time T21 is set longer as illustrated in the upper diagram compared to an on-duration time T24 illustrated in the lower diagram of a case in which use frequency is low. A short DRX cycle T22 is set shorter compared to a short DRX cycle T25 when the use frequency is low. A DRX inactivity timer T23 is set longer compared to a DRX inactivity timer T26 when the use frequency is low. Thus, when communication frequency is high, appropriate communication becomes available by increasing the ratio of the discontinuous reception.

When communication traffic decreases such as in the working hours, the on-duration time T24 is set shorter as illustrated in the lower diagram compared to the on-duration time T21 illustrated in the upper diagram of the case in which use frequency is high. The short DRX cycle T25 is set longer compared to the short DRX cycle T22 when the use frequency is high. The DRX inactivity timer T26 is set shorter compared to the DRX inactivity timer T23 when the use frequency is high. Thus, when communication frequency is low, power consumption saving is achieved by decreasing the ratio of the discontinuous reception.

Figure 16:
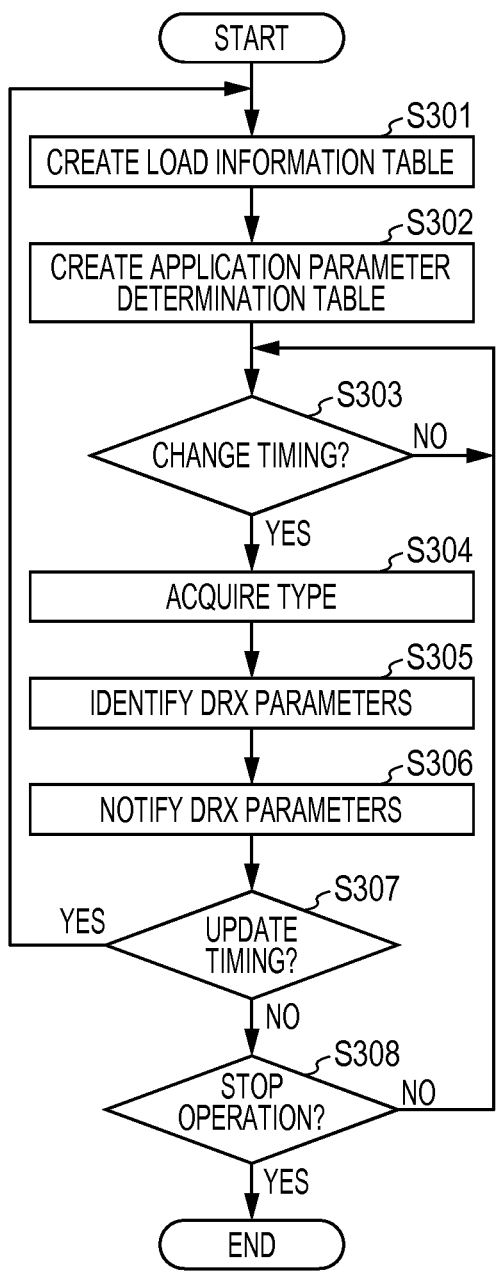
FIG. 16 is a flowchart of DRX parameter setting with statistical information.

Next, a flow of DRX parameter setting with statistical information is described with reference to FIG. 16. FIG. 16 is a flowchart illustrating DRX parameter setting with statistical information. Here, in the flowchart of FIG. 16, an example of no event occurrence is described. In practice, when an event occurs, the process shifts from the flow of this processing to the processing of the event DRX parameter setting described in the first embodiment.

The information management part 104 calculates the number of connected UEs and the communication traffic for each time zone of each day of the week on the basis of the past number of connected UEs and the past communication traffic, and creates the load information table 403 (S301).

Next, the information management part 104 creates the application parameter determination table 404 on the basis of the application type table 402 and the load information table 403 (S302).

The parameter control part 103 determines whether a next change timing has arrived (S303). If the next change timing has not yet arrived (S303: No), the parameter control part 103 waits until the next change timing arrives.

If the next change timing has arrived (S303: Yes), the parameter control part 103 acquires a parameter combination type to be applied from the application parameter determination table 404 (S304).

Next, the parameter control part 103 identifies DRX parameters corresponding to the acquired parameter combination type from the DRX parameter table 401 (S305).

Next, the parameter control part 103 notifies the identified DRX parameters to the UE 3 (S306).

Thereafter, the information management part 104 determines whether a DRX parameter update timing has arrived (S307). If the DRX parameter update timing has arrived (S307: Yes), the information management part 104 returns to S301.

If the DRX parameter update timing has not yet arrived (S307: No), the parameter control part 103 determines whether the DRX parameter control part 10 stops operation (S308). Here, the DRX parameter control part 10 stops operation, for example, when the base station device 1 is instructed to stop operation by an operator. If operation of the DRX parameter control part 10 continues (S308: No), the parameter control part 103 returns to S303.

If the DRX parameter control part 10 stops operation (S308: Yes), the parameter control part 103 ends the DRX parameter setting.

Figure 17:
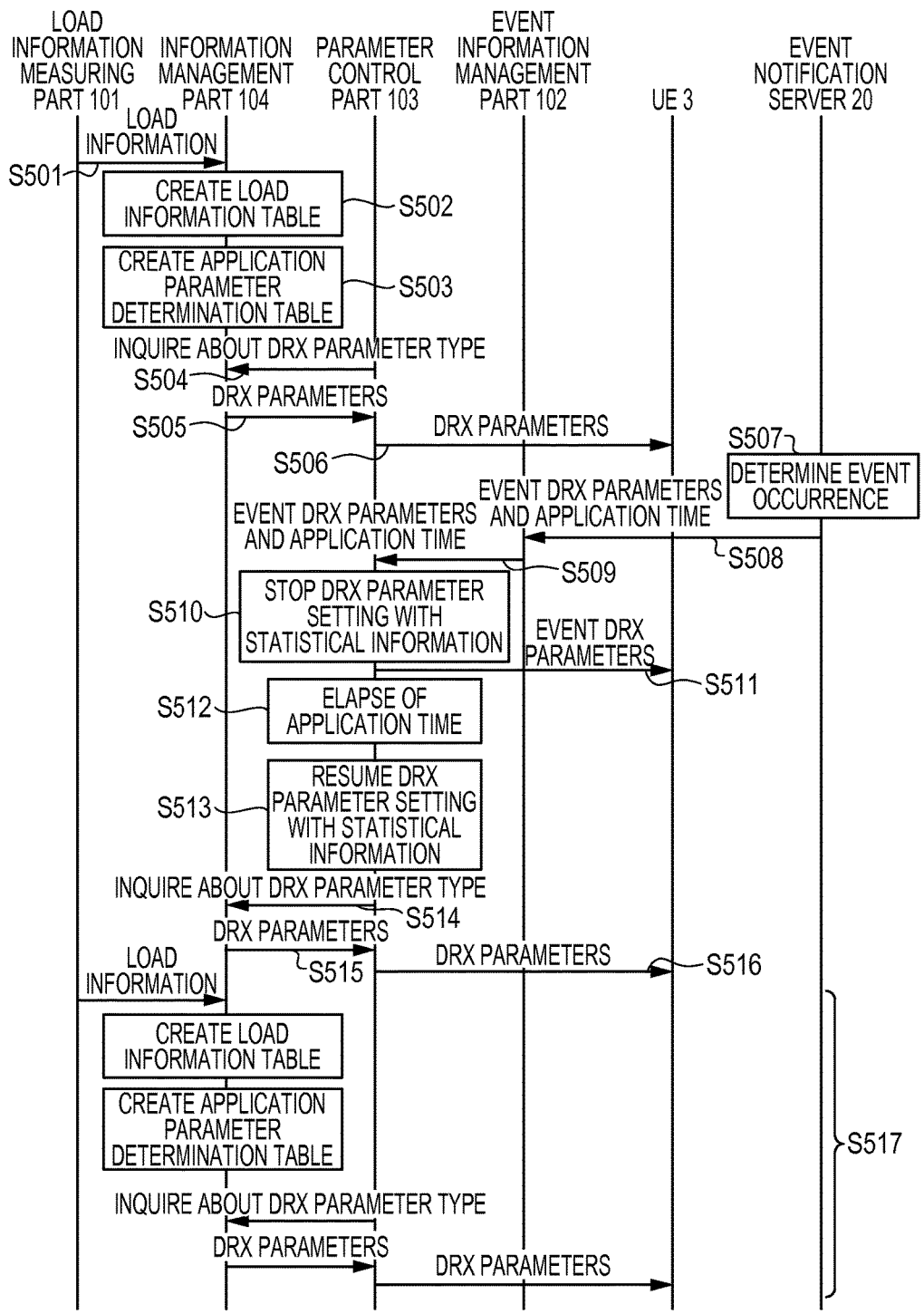
FIG. 17 is a sequence diagram of DRX parameter setting in a radio access system according to a second embodiment.

Next, a flow of the DRX parameter setting in a radio access system according to the second embodiment is described with reference to FIG. 17. FIG. 17 is a sequence diagram illustrating the DRX parameter setting in the radio access system according to the second embodiment. In FIG. 17, assume that an event occurs in a state where the DRX parameters are set with statistical information, and the application time has elapsed thereafter. Here, description of similar processing as in FIG. 16 is simplified. The number of connected UEs and the communication traffic are collectively referred to as the load information.

The information management part 104 acquires load information from the load information measuring part 101 (S501). The information management part 104 creates the load information table 403 (S502). Next, the information management part 104 creates the application parameter determination table 404 (S503).

At a change timing, the parameter control part 103 inquires with the information management part 104 about the parameter combination type to be applied (S504). Then, the parameter control part 103 acquires the DRX parameters from the information management part 104 (S505). The parameter control part 103 notifies the acquired DRX parameters to the UE 3 (S506).

Thereafter, the event notification server 20 determines that an event occurs (S507). Then, the event notification server 20 notifies the event DRX parameters and the application time to the event information management part 102 (S508). The parameter control part 103 acquires the event DRX parameters and the application time from the event information management part 102 (S509).

The parameter control part 103 stops the DRX parameter setting with statistical information (S510). Then, the parameter control part 103 notifies the event DRX parameters to the UE 3 (S511).

Thereafter, the parameter control part 103 waits until the application time elapses (S512).

After elapse of the application time, the parameter control part 103 resumes the DRX parameter setting with statistical information (S513).

Thereafter, at a change timing, the parameter control part 103 inquires with the information management part 104 about the parameter combination type to be applied (S514). Then, the parameter control part 103 acquires the DRX parameters from the information management part 104 (S515). The parameter control part 103 notifies the acquired DRX parameters to the UE 3 (S516).

Thereafter, the parameter control part 103 performs the DRX parameter setting with statistical information similar with S501 to S506 (S517).

As described above, the radio access system according to the present embodiment changes the DRX parameters on the basis of statistical information. Therefore, in a small cell environment where there is a similar communication tendency, the radio access system is capable of saving power consumption in an effective manner.

By changing the DRX parameters on the basis of statistical information of the past, calculation of the load difference at short intervals may be omitted, and appropriate DRX parameter setting may be performed without increasing the load of the base station device. In particular, higher effects may be expected in a state where a characteristic of the use tendency is found more easily among users within a cell area of a small-size cell.

Although the DRX parameter setting with statistical information is performed for each time zone of each day of the week in the second embodiment described above, the setting of the interval is not limited particularly, as far as being cyclic.

Further, a combined operation of the DRX parameter setting with statistical information and the event DRX parameter setting is described with reference to FIG. 18 to FIG. 20.

Figure 18:
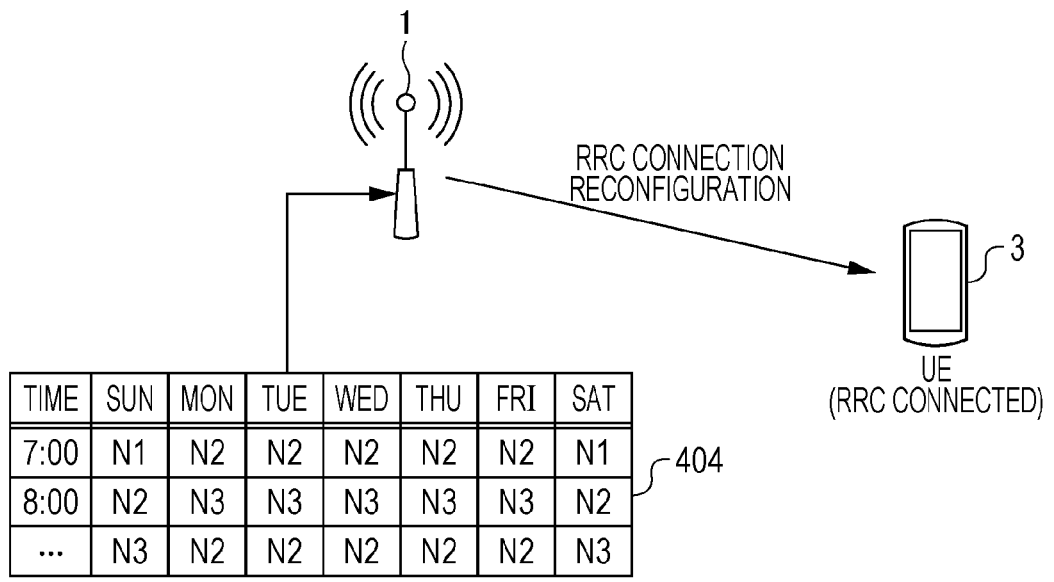
FIG. 18 is a diagram illustrating a state of a radio access system performing DRX parameter setting with statistical information.

FIG. 18 illustrates a state of the radio access system performing the DRX parameter setting with statistical information. FIG. 19 illustrates a state of the radio access system when a train accident occurs. FIG. 20 illustrates a state of the radio access system after recovery from the train accident.

When the DRX parameter setting with statistical information is being performed, the base station device 1 changes the DRX parameters for each time zone of each day of the week, for example, with reference to the application parameter determination table 404, as illustrated in FIG. 18. Then, the base station device 1 sends the RRC connection reconfiguration message to the UE 3 in the on-duration time to notify the change of the DRX parameters. The changed DRX parameters are applied to the UE 3 when the RRC connection setup message is sent if the UE 3 is not in the RRC connected state, that is, in the RRC_IDLE state. Then, the UE 3 starts operation of the discontinuous reception in accordance with the notified DRX parameters.

Figure 19:
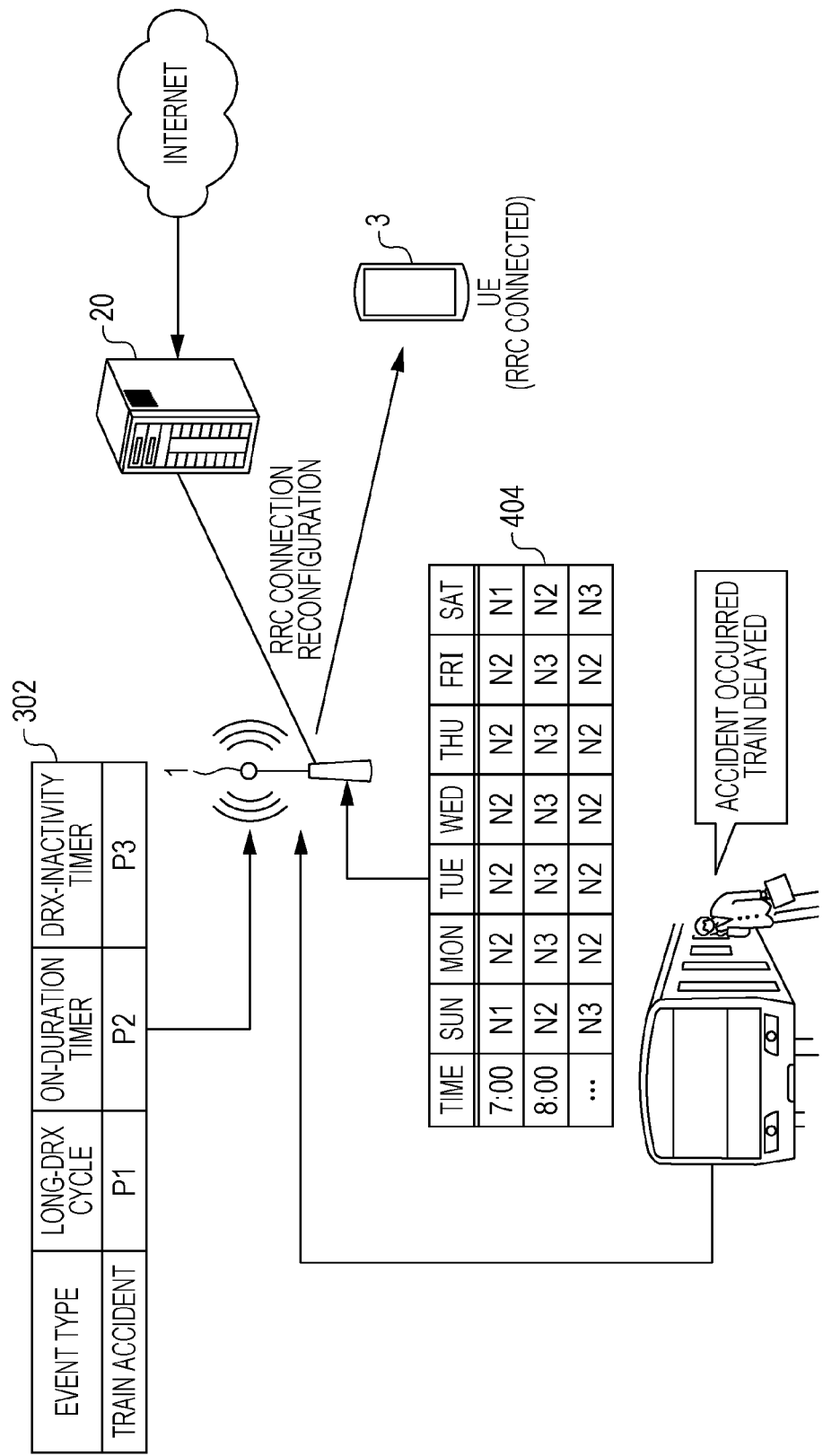
FIG. 19 is a diagram illustrating a state of a radio access system when a train accident occurs.
Figure 20:
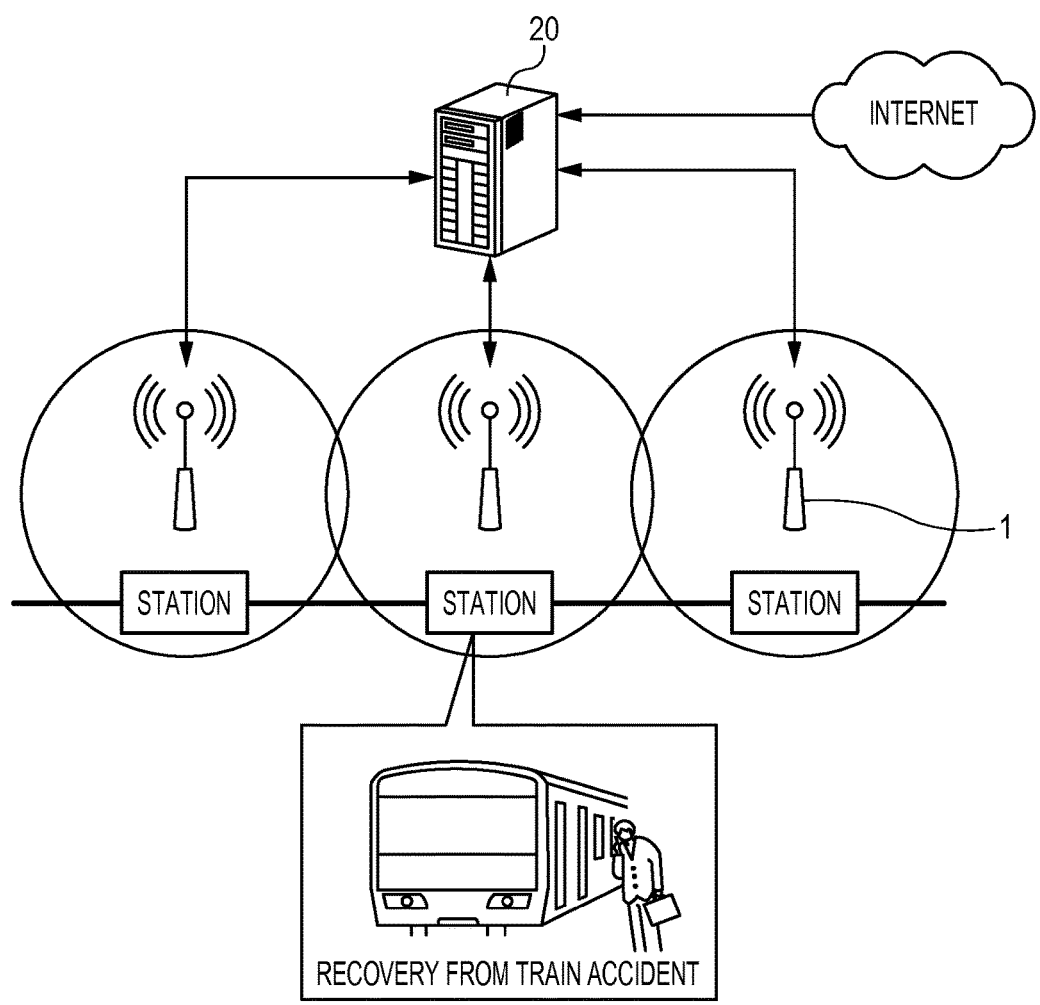
FIG. 20 is a diagram illustrating a state of a radio access system after recovery from a train accident.

When a traffic accident occurs, as illustrated in FIG. 19, the event notification server 20 determines that an event occurs if a change rate between measured load information and preceding load information or load information at the same time in the past is larger than an event threshold value. Then, the event notification server 20 determines the event type and the event scale on the basis of information acquired from the global network such as the Internet and load information acquired from nearby base station devices 1. Then, the event notification server 20 determines event DRX parameters to be applied with reference to the event DRX parameter table 302. Further, after determining the event type, the event notification server 20 determines the application range and the application time of the event on the basis of the event impact, distance impact, and event scale of nearby base station devices 1. Then, the event notification server 20 notifies the event DRX parameters and the application time to base station devices 1 within the determined event application range. Base station devices 1, which have received the event DRX parameters, notify the change of the DRX parameters to the UE 3 by using the RRC connection reconfiguration message. At that time, base station devices 1, which have received the event DRX parameters, suspend changing of the DRX parameters for each time zone of each day of the week using the application parameter determination table 404, and so on. The UE 3 starts operation of the discontinuous reception in accordance with the notified event DRX parameters.

When the application time has elapsed after reception of the event DRX parameters, or when the event notification server 20 determines that the occurred event has ended, the base station device 1 starts a processing of releasing the event DRX parameter setting. For example, as illustrated in FIG. 20, upon being notified of the recovery from the train accident, the event notification server 20 notifies the event end to the base station device 1 to which the event DRX parameters have been notified. The base station device 1, which has received the notification of the event end, stops application of the event DRX parameters. Then, the base station device 1 starts the DRX parameter setting with statistical information. The UE 3 starts operation of the discontinuous reception on the basis of the DRX parameters using statistical information notified by the base station device 1. Each of base station devices 1 continues transmission of load information to the event notification server 20.

Here, although the event notification server 20 according to the embodiments described above is arranged within the EMS 2, the event notification server 20 may be configured in a different manner if arranged on a network coupled to the base station device 1. For example, the event notification server 20 may be configured as an independent stand-alone server. The event notification server 20 may be arranged in the base station device 1.

Figure 21:
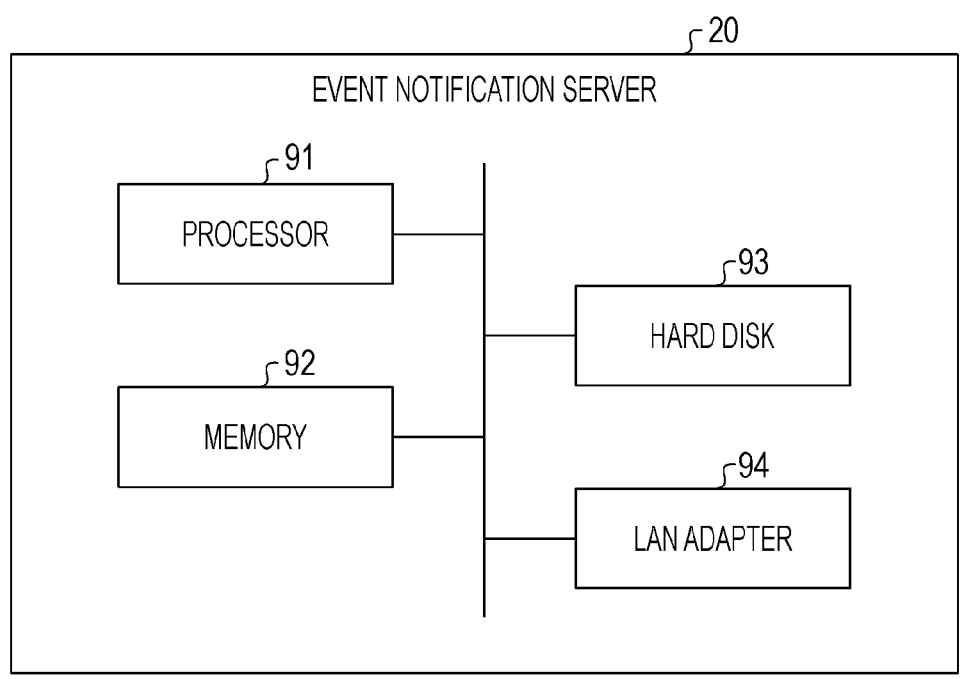
FIG. 21 is a diagram illustrating an exemplary hardware configuration of an event notification server.

Next, a hardware configuration of the event notification server described in the above embodiments is described with reference to FIG. 21. FIG. 21 illustrates an exemplary hardware configuration of the event notification server. Here, it is assumed that the event notification server 20 is configured as an independent server.

As illustrated in FIG. 21, the event notification server 20 includes a processor 91, a memory 92, a hard disk 93, and a local area network (LAN) adapter 94.

The memory 92, hard disk 93, and LAN adapter 94 are coupled to the processor 91 via a bus.

The LAN adapter 94 implements functions of the communication control part 201 illustrated in FIG. 3.

The hard disk 93 stores therein various programs including programs implementing functions of the load information management part 202, the event occurrence determination part 203, and the global information acquisition part 204, illustrated in FIG. 3. The hard disk 93 also stores therein the event type table 301, the event DRX parameter table 302, the event impact table 303, and the distance impact table 304.

The processor 91 reads various programs from the hard disk 93, and develops on the memory 92. Then, the processor 91 executes programs developed on the memory to implement functions of the load information management part 202, the event occurrence determination part 203, and the global information acquisition part 204, illustrated in FIG. 3.

When the event notification server 20 is disposed in another device, a processor and a memory in the device serve as the processor 91 and the memory 92 illustrated in FIG. 21 to implement functions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station device, comprising:
a memory; and
a processor coupled to the memory, the processor being configured to:
  acquire first information on a first communication load of the base station device, the first communication load being a current communication load of the base station;
  determine, on basis of the first information, whether a first event occurs, wherein the determining whether the first event occurs includes calculating a first change rate between the first communication load and a preceding communication load of the base station device, with the first communication load and the preceding communication load being based on consecutive load intervals, and wherein the first event occurs when the first change rate is equal to or larger than a predetermined threshold value;
  acquire, upon determining that the first event occurs, second information on second communication loads of other base station devices located within a predetermined range from the base station device;
  determine an impact range and an impact time of the first event on basis of the first information and the second information, the impact range being a range in which communication is affected by the first event, the impact time being a duration during which communication is affected by the first event; and
  instruct terminal devices within the impact range to change, during the impact time, a setting of discontinuous reception from a normal setting to a first setting for easier detection of an incoming call by increasing chances of detecting the incoming call.

2. The base station device according to claim 1, wherein the processor is further configured to:
store third information on a third communication load of the base station device at a same time of past days as a present time;
calculate a second change rate between the first communication load and the third communication load; and
determine that the first event occurs when the second change rate is equal to or larger than a second predetermined threshold value.

3. The base station device according to claim 1, wherein the processor is further configured to:
   determine that the first event occurs when an external device notifies the base station device that the first event occurs.

4. The base station device according to claim 1, wherein the processor is further configured to:
   notify the change to other base station devices within the impact range; and
   instruct, upon receiving a notification of the change, first terminal devices under control of the base station device to use the first setting during the impact time.

5. The base station device according to claim 4, wherein the processor is further configured to:
   determine a second setting of discontinuous reception for each time and date on basis of information on communication loads of the base station device in past days; and
   instruct the first terminal devices to use the second setting as the normal setting.

6. A radio access system, comprising:
   a plurality of base station devices each including:
      a first processor configured to:
         instruct, upon receiving a change notification, terminal devices under control of each of the plurality of base station devices to change, during an impact time, a setting of discontinuous reception to a setting for easier detection of an incoming call by increasing chances of detecting the incoming call; and
   a setting management device including:
      a second processor configured to:
         acquire first information on a first communication load of a first base station device of the plurality of base station devices, the first communication load being a current communication load of the base station;
         determine, on basis of the first information, whether a first event occurs, wherein the determining whether the first event occurs includes calculating a first change rate between the first communication load and a preceding communication load of the base station device, with the first communication load and the preceding communication load being based on consecutive load intervals, and wherein the first event occurs when the first change rate is equal to or larger than a predetermined threshold value;
         acquire, upon determining that the first event occurs, second information on second communication loads of second base station devices located within a predetermined range from the first base station device;
         determine an impact range and the impact time of the first event on basis of the first information and the second information, the impact range being a range in which communication is affected by the first event, the impact time being a duration during which communication is affected by the first event; and
         transmit the change notification to base station devices within the impact range.

7. A method of controlling a base station device, the method comprising:
   acquiring, by a processor, first information on a first communication load of the base station device, the first communication load being a current communication load of the base station;
   determining, on basis of the first information, whether a first event occurs, wherein the determining whether the first event occurs includes calculating a first change rate between the first communication load and a preceding communication load of the base station device, with the first communication load and the preceding communication load being based on consecutive load intervals, and wherein the first event occurs when the first change rate is equal to or larger than a predetermined threshold value;
   acquiring, upon determining that the first event occurs, second information on second communication loads of other base station devices located within a predetermined range from the base station device;
   determining an impact range and an impact time of the first event on basis of the first information and the second information, the impact range being a range in which communication is affected by the first event, the impact time being a duration during which communication is affected by the first event; and
   instructing terminal devices within the impact range to change, during the impact time, a setting of discontinuous reception to a setting for easier detection of an incoming call by increasing chances of detecting the incoming call.

* * * * *